(12) United States Patent
Yashiro et al.

(10) Patent No.: US 8,431,207 B2
(45) Date of Patent: Apr. 30, 2013

(54) OPTICAL RECORDING MATERIAL, OPTICAL RECORDING MEDIUM, AND RECORDING AND REPRODUCING METHOD OF OPTICAL RECORDING MEDIUM

(75) Inventors: Tohru Yashiro, Yokosuka (JP); Fumiya Ohmi, Kawasaki (JP); Satoshi Mizukami, Sagamihara (JP); Yuki Nakamura, Machida (JP); Masahiro Hayashi, Atsugi (JP); Ippei Matsumoto, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 915 days.

(21) Appl. No.: 12/522,778

(22) PCT Filed: Jan. 10, 2008

(86) PCT No.: PCT/JP2008/050562
§ 371 (c)(1),
(2), (4) Date: Jul. 10, 2009

(87) PCT Pub. No.: WO2008/084879
PCT Pub. Date: Jul. 17, 2008

(65) Prior Publication Data
US 2010/0118680 A1    May 13, 2010

(30) Foreign Application Priority Data

Jan. 12, 2007   (JP) ................ 2007-004856
Jan. 25, 2007   (JP) ................ 2007-015040

(51) Int. Cl.
*G11B 7/24*     (2006.01)
*B32B 3/00*     (2006.01)

(52) U.S. Cl.
USPC ............ 428/64.8; 428/64.4; 430/270.19; 430/270.2; G9B/7.151; G9B/7.156

(58) Field of Classification Search ........... 428/64.4, 428/64.8; 430/270.18, 270.19, 270.2, 270.21; G9B/7.151, 7.156
See application file for complete search history.

(56) References Cited

U.S. PATENT DOCUMENTS

| 6,737,143 B2 * | 5/2004 | Noguchi et al. ............ 428/64.1 |
| 7,095,706 B2 | 8/2006 | Nakamura et al. |
| 7,251,212 B2 | 7/2007 | Nakamura et al. |

(Continued)

FOREIGN PATENT DOCUMENTS

| CA | 2558599 | 8/2006 |
| EP | 1548723 A2 | 6/2005 |

(Continued)

OTHER PUBLICATIONS

May 30, 2011 European search report in connection with counterpart European patent application No. 08 70 3416.

(Continued)

*Primary Examiner* — Gerard Higgins
(74) *Attorney, Agent, or Firm* — Cooper & Dunham LLP

(57) ABSTRACT

The present invention provides an optical recording material allows for obtaining excellent recording signal properties even at high-speed recording and is excellent in durability in both a single-sided single layer optical recording medium and a single-sided two-layer optical recording medium having a first recording layer and a second recording layer. The optical recording material contains a cyanine compound having a specific structure and a squarylium compound as dyes for optical recording layers.

13 Claims, 4 Drawing Sheets

U.S. PATENT DOCUMENTS

| | | | |
|---|---|---|---|
| 8,049,018 B2 * | 11/2011 | Dan-Oh et al. | 548/427 |
| 2005/0142490 A1 | 6/2005 | Shinkai et al. | |
| 2006/0046009 A1 | 3/2006 | Horai | |
| 2006/0088786 A1 | 4/2006 | Tamada et al. | |
| 2006/0110569 A1 | 5/2006 | Yashiro et al. | |
| 2006/0174256 A1 | 8/2006 | Yashiro et al. | |
| 2007/0269628 A1 | 11/2007 | Yashiro | |
| 2008/0316890 A1 | 12/2008 | Yashiro et al. | |

FOREIGN PATENT DOCUMENTS

| | | |
|---|---|---|
| JP | 3698708 | 2/2004 |
| JP | 2005-205874 | 8/2005 |
| JP | 2005-319728 | 11/2005 |
| JP | 2006-44241 | 2/2006 |
| JP | 2008-74904 | 4/2008 |
| KR | 2004-83509 | 10/2004 |
| WO | WO2006/004172 A1 | 1/2006 |
| WO | WO2006/104021 A1 | 10/2006 |
| WO | WO 2007105297 A1 * | 9/2007 |
| WO | WO 2007105336 A1 * | 9/2007 |

OTHER PUBLICATIONS

English Translation of Jan. 18, 2011 Korean official action in connection with a counterpart Korean patent application.

Mar. 15, 2011 Canadian official action in connection with a counterpart Canadian patent application.

* cited by examiner

Reproduced laser beam

Recording/reproducing laser beam

Recording/reproducing laser beam

Recording/reproducing laser beam

Recording/reproducing laser beam

OPTICAL RECORDING MATERIAL, OPTICAL RECORDING MEDIUM, AND RECORDING AND REPRODUCING METHOD OF OPTICAL RECORDING MEDIUM

TECHNICAL FIELD

The present invention relates to an optical recording material that can be used in optical recording area, an optical recording medium using the optical recording material, and a method for recording and reproducing an optical recording medium, and particularly relates to an optical recording material using a cyanine compound and a squarylium compound material.

BACKGROUND ART

In addition to optical recording media such as reproduction-only DVDs (digital versatile discs), recordable DVDs (DVD+RW, DVD+R, DVD-RW, DVD-RAM etc.) have been put to practical use.

The DVD+R, DVD+RW and the like are positioned as an extension of technologies of conventional recordable CD-R and recordable CD-RW (recordable compact disc). However, DVDs+R and DVDs+RW are designed so that the recording density (track pitch, signal mark length) and its substrate thickness and the like can meet DVD conditions from CD conditions to secure reproduction compatibility with reproduction-only DVDs. For example, a DVD+R is produced similarly to a CD-R, by forming a recording layer on a substrate and laminating an information recording substrate with a reflective layer formed on the recording layer with another substrate having the same shape as the information recording substrate. In the recording layer, an organic dye-based material is used.

One of characteristics of CD-R is that it has a high-reflectance (65%) which satisfies the CD standard. To obtain a high-reflectance with the above-mentioned configuration, the recording layer needs to satisfy a specific complex refractive index with a wavelength of recording and reproduction light. The reason for using an organic dye-based material in a recording layer of CD-R is that light absorption properties of an organic dye-based material are more suitable than those of an inorganic material. Light absorption properties are also needed in DVDs.

Further, in the area of reproduction-only DVDs, a reproduction-only DVD having two recording layers is proposed to increase its recording capacity. For example, FIG. 1 is a cross-sectional view showing a DVD structure having two recording layers. A first substrate 101 and a second substrate 102 are laminated to each other with sandwiching an intermediate layer 105 formed of an ultraviolet curable resin therebetween. On the inner surface of the first substrate 101, a first recording layer 103 is formed, on the inner surface of the second substrate 102, a second recording layer 104 is formed. The first recording layer 103 is formed as a semi-transparent film and is formed using a dielectric film and the like. The second recording layer is formed as a reflective film and is formed of a metal film. On the surface of the first recording layer 103, convexoconcave recording marks are formed, and recording signals are read by an effect of reflecting and interfering a reproduction laser beam. Since in the DVD illustrated in FIG. 1, signals are read from the two recording layers, a storage capacity can be obtained at a maximum of about 8.5 GB.

Here, the thickness of the first substrate 101 and the thickness of the second substrate 102 are respectively about 0.6 mm, and the thickness of the intermediate layer 105 is about 50 µm. The first recording layer 103 serving as a semi-transparent film is formed so as to have a reflectance of about 30%, and a laser beam irradiated to reproduce the second recording layer 104 is a reflected beam of which about 30% of the total quantity of light is reflected at the first recording layer 103 and attenuates. Then, the laser beam is reflected at the reflective film of the second recording layer 104, further attenuates at the first recording layer 103 and thereafter is emitted from the optical recording medium. Then, signals stored in the respective recording layers can be reproduced by focusing the laser beam as a reproduction beam so as to be brought to a focus on the first recording layer or the second recording layer and detecting a reflected beam. Note that in the case of a DVD, the wavelength of a recording and reproduction laser beam is about 650 nm.

Similarly to reproduction-only DVDs, in recordable DVDs, DVDs+R and DVDs-R are studied as optical recording media based on a single-sided two-layer type recording and reproducing method (for example, see Patent Literature 1).

However, with the recent development of high-speed recording systems, disc performance suitable for recording at high-linear velocity is required, however, it is difficult for conventional recording media to respond to the demand.

Specifically, a single-sided single layer recording medium of DVD is set to achieve a standard recording/reproduction linear velocity of 3.49 m/s, and a single-sided two-layer recording medium of DVD is set to achieve a standard recording/reproduction linear velocity of 3.83 m/s. In recent years, it is required to respond to achieve a recording linear velocity 12 times to 18 times higher than these standard linear velocities. Unfortunately, under such a high linear velocity condition, thermal interference of recording marks easily occurs and a signal jitter is increased.

In addition to the above, single-sided two-layer optical recording media, even though it is a single-sided two-layer optical recording medium as described in Patent Literature 1, has a problem that a sufficient recording speed and a sufficient recording sensitivity cannot be obtained as compared to conventional single-sided single-layer recording media.

The reason is that, since a single-sided two-layer recording and reproduction type optical recording medium has two recording layers, when signals are recorded with irradiating a rewriting laser beam by focusing the laser beam on a recording layer disposed at the outermost position from an optical pickup, the laser beam attenuates at a first recording layer, and thus it is difficult to obtain both light absorption and light reflection necessary for recording the signals on a second recording layer.

Particularly for a second recording layer, there is a problem that it is difficult to form recording marks thereon because a second recording layer has a different layer structure from those of existing CDs-R and DVDs+R. In an existing single-layer recording and reproducing medium, a substrate, a dye layer, a reflective layer and a protective layer are formed in this order as viewed from the light incident side of the medium. However, on a second recording layer side in a two-layer recording and reproducing medium, a laminated layer, (an organic protective layer), a recording layer, a reflective layer and a substrate are formed in this order as viewed from the light incident side (as viewed from a laser beam that has been optically transmitted to the first recording layer). Thus, the surrounding environment of forming recording marks on a second recording layer (adjacent layer) differs between a two-layer recording and reproducing medium and a CD-R or the like. For this reason, it is difficult to control of forming recording marks when a recording linear velocity is high, and recording and reproducing properties such as a modulation degree and a jitter that can be used in DVD systems are hardly obtained.

In the meanwhile, as dye materials for DVD recording layer, cyanine dyes, azo dyes, squarylium dyes and the like have been put into practical use. Of these materials, as a dye material suitable for high-speed recording performance, cyanine dyes are proposed (for example, see Patent Literature 2 and Patent Literature 3). However, cyanine dyes are not capable of securing a practical durability. Specifically, it is difficult for a cyanine dye to retain data in a disc durability test under high-temperature and high-humidity environment such as 80° C.-85% RH. Accordingly, the current situation is that it is desired to immediately develop a single-sided single-layer optical recording medium that is excellent in durability and enables obtaining excellent signal properties even at a recording speed of 12 times to 18 times higher than the standard recording speed and to develop a single-sided two-layer recording and reproduction type optical recording medium.

Patent Literature 1 Japanese Patent Application Laid-Open (JP-A) No. 2006-44241
Patent Literature 2 Japanese Patent (JP-B) No. 3698708
Patent Literature 3 Japanese Patent Application Laid-Open (JP-A) No. 2005-205874

DISCLOSURE OF INVENTION

The present invention is proposed in view of the present situation and aims to solve the various conventional problems and to achieve the following objects. Specifically, the present invention aims to provide an optical recording material that enables obtaining excellent signal-recording properties even at a high-speed recording and is excellent in durability in a single-sided single-layer optical recording medium and a single-sided two-layer optical recording medium having a first recording layer and a second recording layer, an optical recording medium using the optical recording material, and a method for recording and reproducing an optical recording medium using the optical recording medium.

The present inventors found that as a means to solve the above-mentioned problems, an optical recording medium having useful and improved optical properties as a DVD optical recording disc system using a laser having a wavelength range of 645 nm to 675 nm could be obtained by using a cyanine compound (may be referred to as "cyanine dye") having a specific structure and a squarylium compound as dyes used for recording layer. The present invention is based on the findings.

Specifically, the present invention is composed of the optical recording materials, the optical recording medium and the method for recording and reproducing an optical recording medium as described below (1) to (13).
(1) An optical recording material containing a cyanine compound represented by the following general formula (A) and a squarylium compound represented by the following general formula (I).

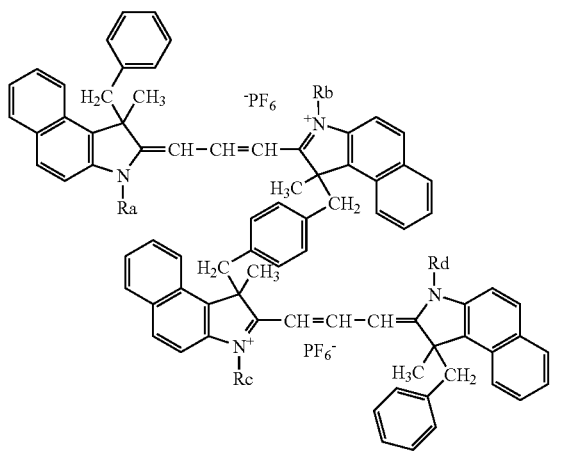

[In general formula (A), Ra, Rb, Rc and Rd represent independently a hydrogen atom, an alkyl group that may have a substituent group, an aryl group that may have a substituent group or an aralkyl group that may have a substituent group],

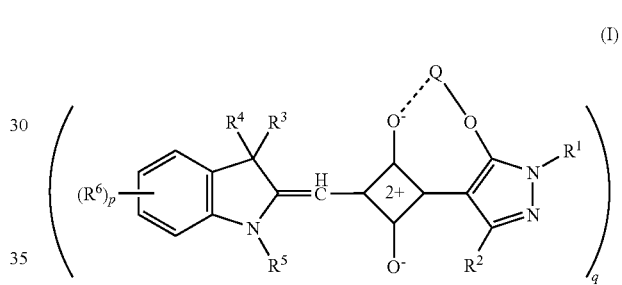

[In general formula (I), $R^1$ and $R^2$ may be the same to each other or different from each other and respectively represent an alkyl group that may have a substituent group, an aralkyl group that may have a substituent group, an aryl group that may have a substituent group or a heterocyclic group that may have a substituent group; "Q" represents a metal atom having a coordinating ability; "q" is an integer of 2 or 3; $R^3$ and $R^4$ may be the same to each other or different from each other, and respectively represent an alkyl group that may have a substituent group, an aralkyl group that may have a substituent group, or an aryl group that may have a substituent group, and $R^3$ and $R^4$ may be bound to each other to form an alicyclic hydrocarbon ring or a heterocyclic ring; $R^5$ represents a hydrogen atom, an alkyl group that may have a substituent group, an aralkyl group that may have a substituent group or an aryl group that may have a substituent group; $R^6$ represents a halogen atom, an alkyl group that may have a substituent group, an aralkyl group that may have a substituent group, an aryl group that may have a substituent group, a nitro group, a cyano group or an alkoxy group that may have a substituent group; "p" is an integer of 0 to 4; here, when "p" is an integer of 2 to 4, each $R^6$ may be the same to each other or different from each other, and further two adjacent $R^6$ may be bound to two adjacent carbon atoms to form an aromatic ring that may have a substituent group.]
(2) The optical recording material according to the item (1), wherein a mixing ratio, A/I, of the cyanine compound (A) and the squarylium compound (I) is 10/90 to 70/30 by weight ratio.
(3) The optical recording material according to the item (1), wherein "Q" is aluminum.
(4) The optical recording material according to any one of the items (1) to (3), wherein $R^1$ is a phenyl group, and $R^2$ is an unsubstituted or a halogen-substituted alkyl group.

(5) The optical recording material according to the item (4), wherein $R^2$ is a trifluoromethyl group.
(6) The optical recording material according to the item (4), wherein $R^2$ is an alkyl group having a branched chain.
(7) The optical recording material according to the item (6), wherein $R^2$ is an isopropyl group.
(8) The optical recording material according to any one of the items (1) to (7), wherein $R^3$ and $R^4$ may be the same to each other or different from each other and respectively a benzyl group that may have a substituent group.
(9) The optical recording material according to any one of the items (1) to (8), wherein $R^5$ is a benzyl group.
(10) The optical recording material according to any one of the items (1) to (9), wherein $R^6$ is a naphthyl group formed with a benzene ring.
(11) An optical recording medium having a substrate, and a recording layer which includes an optical recording material according to any one of the items (1) to (10), formed on the substrate.
(12) The optical recording medium according to the item (11), wherein the recording layer further contains a formazan chelate compound.
(13) A method for recording and reproducing an optical recording medium including: performing any one of recording and reproducing of signal information by irradiating an optical recording medium according to the item (11) with a laser beam having a recording wavelength of 580 nm to 720 nm from a substrate surface side thereof.

The present invention can provide a single-sided single-layer optical recording medium and a single-sided two-layer optical recording medium that can solve the above-mentioned conventional problems, are excellent in durability and enable obtaining excellent recording signal properties.

BEST MODE FOR CARRYING OUT THE INVENTION

Figure 1:
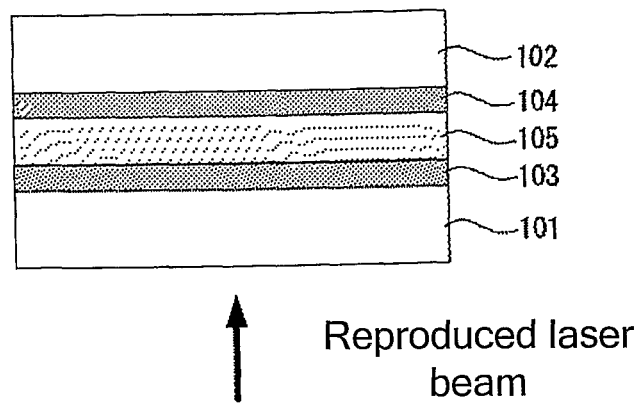
FIG. 1 is a view showing one example of a layer structure of a conventional optical recording medium.

The optical recording medium of the present invention has, as a single-sided single-layer recording medium, a substrate and a recording layer containing an organic dye on the substrate and further has a reflective layer and a protective layer in accordance with necessity.

Further, the optical recording medium of the present invention has, as a single sided two-layer optical recording medium, a first information layer and a second information layer with interposition of an intermediate layer formed therebetween and further has other layers in accordance with necessity.

The first information layer according to a first embodiment of the optical recording medium of the present invention has a first substrate, and a reproduction-only first recording layer composed of a reflective film formed on the first substrate and further has other layers in accordance with necessity.

The first information layer according to a second embodiment of the present invention has a first substrate, at least a first recording layer containing an organic dye and a first reflective layer (semi-transparent layer) formed in this order on or above the first substrate, and further has other layers such as a protective layer, an undercoat layer and a hard coat layer in accordance with necessity.

In other words, the first information layer has the same layer structure as that of a single-sided single layer recording medium except that the reflective layer is semi-transparent.

Further, the second information layer has a second substrate, at least a reflective layer, a second recording layer containing an organic dye and a protective layer formed in this order on or above the second substrate and further has other layers such as a protective layer, an undercoat layer and a hard coat layer in accordance with necessity.

The optical recording medium is irradiated with a laser beam having a recording wavelength of 580 nm to 720 nm from the first substrate surface side to thereby perform at least any one of recording and reproducing signal information stored in the first recording layer and the second recording layer.

Here, in a two-layered optical recording medium having a first recording layer and a second recording layer, when a recording mark is formed on the second recording layer with reproduced light that has attenuated at the first recording layer and a reflective layer (or the second reflective layer), it induces more light attenuation by just the amount of light absorbed to the first recording layer than the light attenuation in two-layered ROM (DVD-ROM etc.). As a result, a high recording sensitivity is hardly obtained at the second recording layer. Further, there is a problem that at the second recording layer, focus offset easily occurs due to optical aberration, and recording marks widen, which easily increases cross-talk between adjacent tracks. Further, the groove shape of the second substrate causes an increase in cross-talk. Specifically, when a polarity of convex portions is adjusted to meet the polarity of concave portions of the second recording layer as viewed from the incident surface side, recording marks are formed in inter-groove portions (convex portions), and thus an effect of preventing the recording marks from widening cannot be obtained by means of the groove. When recording marks are formed in inter-groove portions on the second recording layer, the main reflection surface of the second recording layer is an interfacial surface between the recording layer and the reflective layer (or the second reflective layer), and thus to obtain a similar reflectance to that of the first recording layer, the groove depth of the second recording layer needs to be shallower than the groove depth of the first substrate. Accordingly, cross-talk tends to increase on the second recording layer. For this reason, when recording particularly at high linear velocity (15 m/s or more), a high-power is needed and a jitter value is likely to increase due to the widened recording marks.

Therefore, in the present invention, to increase a recording sensitivity of the second recording layer and obtain excellent signal properties while avoiding occurrence of widened recording marks, it is preferable that (i) the second recording layer contain a cyanine compound having a specific structure (A) (may be referred to as "cyanine compound (A)" and at least one selected from squarylium compounds (I); (ii) a protective layer be formed in contact with the second recording layer as a deformation prevention layer to prevent thermal deformation; and further, (iii) the depth of a guide groove formed on the second substrate be optimized to obtain a high-reflectance from the second recording layer.

The recording layer contains a cyanine compound (A) and at least one selected from squarylium compounds represented by the following general formula (I) (may be referred to as "squarylium compound (I)".

(A)

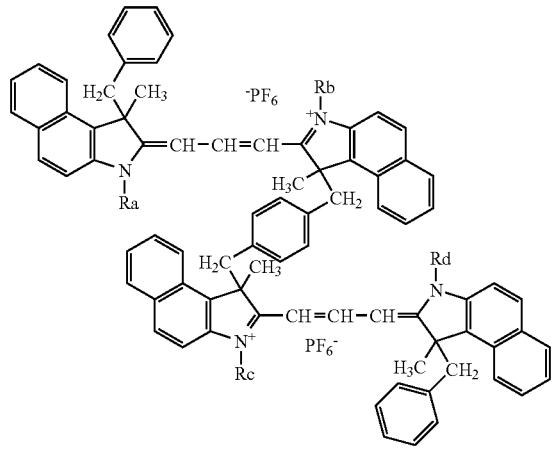

In the cyanine compound (A), Ra, Rb, Rc and Rd represent independently a hydrogen atom, an alkyl group that may have a substituent group, an aryl group that may have a substituent group or an aralkyl group that may have a substituent group. In the cyanine compound (A), Ra, Rb, Rc and Rd preferably have 10 or less carbon atoms, and more preferably are alkyl groups having 1 to 4 carbon atoms. When the number of carbon atoms increases, the thermal decomposition temperature decreases and the durability reduces. Meanwhile, when the number of the carbon atoms is small, the solubility in the coating solvent decreases, which makes it difficult to form a film by spin-coating.

Among the cyanine compounds (A), the following cyanine compound (A') is more preferable.

(A')

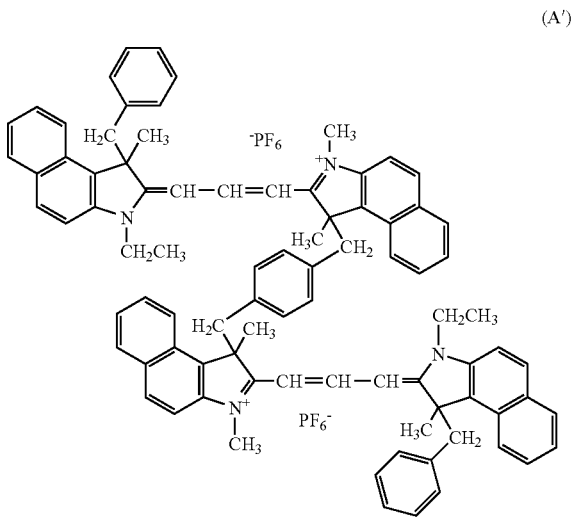

(I)

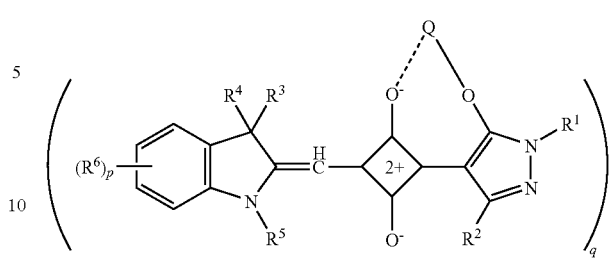

Of these squarylium compounds, a squarylium compound in which an aluminum complex having a benzyl group at tertiary site of an indolinium group is formed is particularly preferable because it causes less cross-talk.

In general formula (I), $R^1$ and $R^2$ may be the same to each other or different from each other and respectively represent an alkyl group that may have a substituent group, an aralkyl group that may have a substituent group, an aryl group that may have a substituent group or a heterocyclic group that may have a substituent group; "Q" represents a metal atom having a coordinating ability; "q" is an integer of 2 or 3; $R^3$ and $R^4$ may be the same to each other or different from each other, and respectively represent an alkyl group that may have a substituent group, an aralkyl group that may have a substituent group, or an aryl group that may have a substituent group, and $R^3$ and $R^4$ may be bound to each other to form an alicyclic hydrocarbon ring or a heterocyclic ring; $R^5$ represents a hydrogen atom, an alkyl group that may have a substituent group, an aralkyl group that may have a substituent group or an aryl group that may have a substituent group; $R^6$ represents a halogen atom, an alkyl group that may have a substituent group, an aralkyl group that may have a substituent group, an aryl group that may have a substituent group, a nitro group, a cyano group or an alkoxy group that may have a substituent group; "p" is an integer of 0 to 4; here, when "p" is an integer of 2 to 4, each $R^6$ may be the same to each other or different from each other, and further two adjacent $R^6$ may be bound to two adjacent carbon atoms to form an aromatic ring that may have a substituent group.

Further, "Q" is preferably aluminum.

Then, "$R^1$" is a phenyl group, and "$R^2$" is preferably an unsubstituted or a halogen-substituted alkyl group.

It is also preferable that "$R^2$" be an alkyl group having a branched chain.

Further, it is more preferable that "$R^2$" be a trifluoromethyl group or an isopropyl group.

Furthermore, each of "$R^3$" and "$R^4$" is preferably an unsubstituted aryl group and more preferably a benzyl group.

Still further, "$R^6$" is preferably a naphthyl group that is formed with a benzene ring.

Here, in the definition of an unsubstituted group in General Formula (I), for an alkyl portion in the alkyl group and the alkoxy group, alkyl groups each having 1 to 6 straight chain or branched carbon atoms and cyclic alkyl groups each having 3 to 8 carbon atoms are exemplified. Examples thereof include methyl group, ethyl group, propyl group, isopropyl group, butyl group, isobutyl group, sec-butyl group, tert-butyl group, pentyl group, isopentyl group, 1-methylbutyl group, 2-methylbutyl group, tert-pentyl group, hexyl group, cyclopropyl group, cycloheptyl group and cyclooctyl group.

The aralkyl group preferably has 7 to 19 carbon atoms, and more preferably 7 to 15 carbon atoms. Examples thereof include benzyl group, phenethyl group, phenylpropyl group and naphthylmethyl group.

The aryl group preferably has 6 to 18 carbon atoms and more preferably 6 to 14 carbon atoms. Examples thereof include phenyl group, naphthyl group, anthryl group and azulenyl group.

Examples of the halogen atom include chlorine atoms, bromine atoms, fluorine atoms and iodine atoms.

Examples of the metal atom having a coordinating ability M include aluminum, zinc, copper, iron, nickel, chrome, cobalt, manganese, iridium, vanadium, and titanium. Of these, aluminum is particularly preferable in terms that an optical recording medium exhibits excellent optical properties with use of aluminum.

The aromatic ring formed by two adjacent $R^6$s bound to adjacent carbon atoms preferably has 6 to 14 carbon atoms. Examples thereof include benzene rings and naphthalene rings.

Examples of the heterocyclic ring in the heterocyclic group include a five-membered or six-membered monocyclic aromatic or alicyclic heterocyclic ring containing at least one atom selected from nitrogen atoms, oxygen atoms and sulfur atoms; a dicyclic or tricyclic nitrogen atom in which three-membered to eight-membered rings are condensed; and a condensed or an alicyclic heterocyclic ring containing at least one atom selected from oxygen atoms and sulfur atoms. Specific examples thereof include pyridine rings, pyrazine rings, pyrimidine rings, pyridazine rings, quinoline rings, isoquinoline rings, phthalazine rings, quinazoline rings, quinoxaline rings, naphthylidine rings, cinnoline rings, pyrrole rings, pyrazole rings, imidazole rings, triazole rings, tetrazole rings, thiophene rings, furan rings, thiazole rings, oxazole rings, indole rings, isoindole rings, indazole rings, benzimidazole rings, benzotriazole rings, benzothiazole rings, benzooxazole rings, purine rings, carbazole rings, pyrrolidine rings, piperidine rings, piperazine rings, morpholine rings, thiomorpholine rings, homopiperidine rings, tetrahydropyridine rings, tetrahydroquinoline rings, tetrahydroisoquinoline rings, tetrahydrofuran rings, tetrahydropyrane rings, dihydrobenzofuran rings, and tetrahydrocarbazole rings.

For the substituent groups of the aralkyl group, the aryl group, the alkoxy group, the heterocyclic group and the aromatic ring formed by two adjacent $R^6$s bound to adjacent carbon atoms preferably has 6 to 14 carbon atoms, one to five substituent groups each of which may be the same to each other or different from each other are exemplified. Specific examples thereof include hydroxyl group, carboxyl group, halogen atom, alkyl group, alkoxy group, nitro group, and unsubstituted or substituted amino group. Examples of the halogen atom, the alkyl group and the alkoxy group are the same ones described above.

For the substituent group of the alkyl group, one to three substituent groups each of which may be the same to each other or different from each other. Specific examples thereof include hydroxyl group, carboxyl group, halogen atom and alkoxy group. Examples of the halogen atom and the alkoxy group are the same ones described above.

Examples of the substituent group of the amino group include one to two alkyl groups each of which may be the same to each other or different from each other. Examples of the alkyl group are the same ones described above.

The squarylium compound represented by General Formula (I) can be produced according to a typical production method described in WO02/50190.

Specific examples of the squarylium compound are shown in Table 1. In Table 1, "Ph" represents a phenyl group, "$CF_3$" represents a trifluoromethyl group, "$CH_3$" represents a methyl group, "t-Bu" represents a tertiary butyl group, "i-Pr" represents an isopropyl group, and "cyclohexyl" represents a six-membered ring formed of $R_3$ bound to $R_4$.

TABLE 1

| No. | Dye Structure | | | | | | | |
|---|---|---|---|---|---|---|---|---|
| | R1 | R2 | R3 | R4 | R5 | R6 | Q | q |
| No. 1 | Ph | $CF_3$ | $CH_3$ | $CH_3$ | $CH_3$ | naphthyl | A1 | 3 |
| No. 2 | Ph | $CF_3$ | $CH_3$ | $CH_3$ | benzyl | $CH_3$ | A1 | 3 |
| No. 3 | t-Bu | $CF_3$ | $CH_3$ | $CH_3$ | $CH_3$ | H | A1 | 3 |
| No. 4 | Ph | i-Pr | $CH_3$ | $CH_3$ | $CH_3$ | H | A1 | 3 |
| No. 5 | Ph | $CF_3$ | $CH_3$ | $CH_3$ | $C_2H_5$ | $OCH_3$ | A1 | 3 |
| No. 6 | Ph | $CF_3$ | cyclohexyl | | $CH_3$ | naphthyl | A1 | 3 |
| No. 7 | Ph | $CF_3$ | $CH_3$ | benzyl | $CH_3$ | H | A1 | 3 |
| No. 8 | Ph | $CF_3$ | benzyl | benzyl | $C_2H_5$ | $CH_3$ | A1 | 3 |
| No. 9 | Ph | $CF_3$ | benzyl | benzyl | $C_2H_5$ | naphthyl | A1 | 3 |
| No. 10 | Ph | $CF_3$ | benzyl | benzyl | benzyl | H | A1 | 3 |
| No. 11 | Ph | $CF_3$ | benzyl | benzyl | $CH_3$ | naphthyl | A1 | 3 |

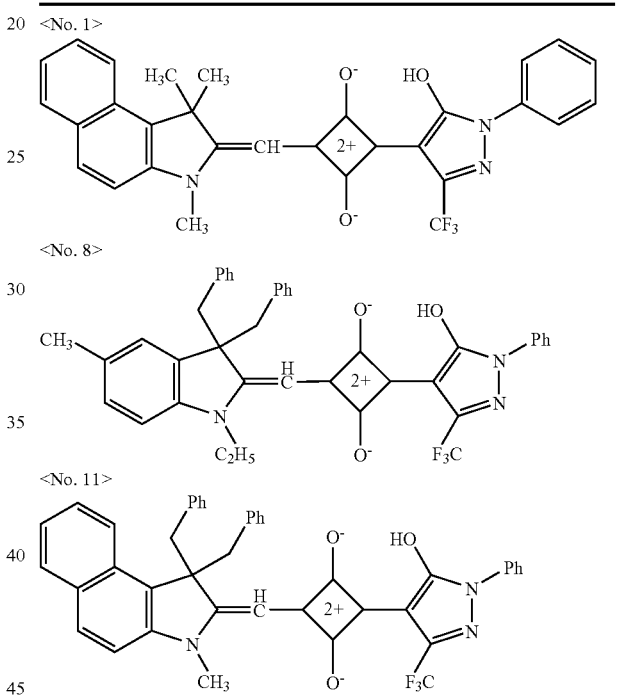

A mixing ratio, A/I, of the cyanine compound (A) and the squarylium compound (I) is preferably 10/90 to 70/30 by weight ratio.

The cyanine compound (A) and the squarylium compound (I) are preferably contained at 50% by weight or more in the optical recording material.

When the additive amount of the cyanine compound (A) is lower than 10% in the mixing ratio, high-speed recording properties (jitter and recording sensitivity at the time of recording at 16× speed) are likely to degrade, and when more than 70%, the reflectance and the durability are likely to degrade.

Further, it is preferable to mix a light-proof agent in the recording layer. Examples of such a light-proof material include formazan metal chelate complexes, azo compounds, diimmonium compounds, bisthiol metal complexes and nitroso compounds.

In particular, it is preferable to add a formazan metal chelate compound in which a metal complex composed of a formazan compound represented by the following General Formula (II) or General Formula (III) and a metal is formed in the recording layer, because the storage stability of the optical recording medium is improved.

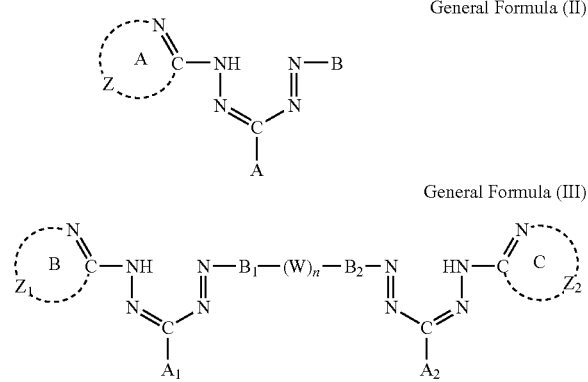

General Formula (II)

General Formula (III)

In General Formulas (II) and (III), a ring A, a ring B and a ring C respectively represent an unsubstituted or a substituted nitrogen-containing five-membered or nitrogen-containing six-membered ring; and Z, $Z_1$ and $Z_2$ respectively represent an atom group that can give the ring A, the ring B and the ring C. These atom groups may include hetero atoms, besides carbon atoms. Examples of the hetero atoms include nitrogen atom (—N—), sulfur atom (—S—), oxygen atom (—O—), and selenium atom (—Se—).

To each of the ring A, the ring B and the ring C, another ring D may be bound. The ring D in this case includes heterocyclic rings, besides carbon rings. In the case of a carbon ring, the number of carbon atoms constituting the carbon ring is preferably 6 to 20 and more preferably 6 to 10. Specific examples thereof include benzene rings, naphthalene rings, and cyclohexane rings. In the meanwhile, in the case of a heterocyclic ring, the number of atoms constituting the heterocyclic ring is preferably 5 to 20 and more preferably 5 to 14. Specific examples thereof include pyrrolidine rings, thiazole rings, imidazole rings, oxazole rings, pyrazole rings, pyridine rings, pyridazine rings, pyrimidine rings, pyrazine rings, quinoline rings, indoline rings, and carbazole rings.

Specific examples of the ring A, the ring B and the ring C include thiazole rings, imidazole rings, thiadiazole rings, oxazole rings, triazole rings, pyrazole rings, oxadiazole rings, pyridine rings, pyridazine rings, pyrimidine rings, pyrazine rings and triazine rings.

Specific examples of the substituent group that is bound to the ring A, the ring B or the ring C include a halogen atom, a nitro group, a cyano group, a hydroxyl group, a carboxyl group, an amino group, a carbamoyl group, an alkyl group that may have a substituent group, an aryl group that may have a substituent group, a heterocyclic ring that may have a substituent group, an alkoxy group that may have a substituent group, an aryloxy group that may have a substituent group, an alkylthio group that may have a substituent group, an arylthio group that may have a substituent group, an alkylamino group that may have a substituent group, an arylamino group that may have a substituent group, an alkoxycarbonyl group that may have a substituent group, an aryloxycarbonyl group that may have a substituent group, an alkylcarboxamide group that may have a substituent group, an arylcarboxamide group that may have a substituent group, an alkylcarbamoyl group that may have a substituent group, an arylcarbamoyl group that may have a substituent group, an alkenyl group that may have a substituent group, and alkylsulfamoyl group that may have a substituent group.

In General Formulas (II) and (III), "A", "$A_1$" and "$A_2$" respectively an alkyl group that may have a substituent group, an aryl group that may have a substituent group, an alkylcarbonyl group that may have a substituent group, an arylcarbonyl group that may have a substituent group, an alkenyl group that may have a substituent group, a heterocyclic ring group that may have a substituent group or an alkoxycarbonyl group that may have a substituent group. The alkyl group and the alkenyl group in this case include chained ones and cyclic ones. The alkyl group and the alkenyl group include chained ones and cyclic ones. The number of carbon atoms in the alkyl group is preferably 1 to 15 and more preferably 1 to 8. The number of carbon atoms in the alkenyl group is preferably 2 to 8 and more preferably 2 to 6.

In General Formula (II), "B" represents an alkyl group that may have a substituent group, an alkenyl group that may have a substituent group or an aryl group that may have a substituent group. The alkyl group and the alkenyl group in this case include chained ones and cyclic ones. The number of carbon atoms in the alkyl group is preferably 1 to 15 and more preferably 1 to 8. The number of carbon atoms in the alkenyl group is preferably 2 to 8 and more preferably 2 to 6. The number of carbon atoms in the aryl group is preferably 6 to 18 and more preferably 6 to 14.

In General Formula (III), $B_1$ and $B_2$ respectively represent an alkylene group that may have a substituent group, an alkenylene group that may have a substituent group or an allylene group that may have as substituent group. The alkyl group and the alkenylene group in this case include chained ones and cyclic ones. The number of carbon atoms in the alkylene group is preferably 1 to 15 and more preferably 1 to 8. The number of carbon atoms in the alkenylene group is preferably 2 to 8 and more preferably 2 to 6. The number of carbon atoms in the allylene group is preferably 6 to 18 and more preferably 6 to 14.

Each of the alkyl groups preferably has 1 to 15 carbon atoms. Specific example thereof include straight chain-alkyl groups such as methyl group, ethyl group, n-propyl group, n-butyl group, n-pentyl group, n-hexyl group, n-heptyl group, n-octyl group, n-nonyl group and n-decyl group; branched alkyl groups such as isobutyl group, isoamyl group, 2-methylbutyl group, 2-methylpentyl group, 3-methylpentyl group, 4-methylpentyl group, 2-ethylbutyl group, 2-methylhexyl group, 3-methylhexyl group, 4-methylhexyl group, 5-methylhexyl group, 2-ethylpentyl group, 3-ethylpentyl group, 2-methylheptyl group, 3-methylheptyl group, 4-methylheptyl group, 5-methylheptyl group, 2-ethylhexyl group, 3-ethylhexyl group, isopropyl group, sec-butyl group, 1-ethylpropyl group, 1-methylbutyl group, 1,2-dimethylpropyl group, 1-methylheptyl group, 1-ethylbutyl group, 1,3-dimethylbutyl group, 1,2-dimethylbutyl group, 1-ethyl-2-methylpropyl group, 1-methylhexyl group, 1-ethylheptyl group, 1-propylbutyl group, 1-isopropyl-2-methylpropyl group, 1-ethyl-2-methylbutyl group, 1-propyl-2-methylpropyl group, 1-methylheptyl group, 1-ethylhexyl group, 1-propylpentyl group, 1-isopropylpentyl group, 1-isopropyl-2-methylbutyl group, 1-isopropyl-3-methylbutyl group, 1-methyloctyl group, 1-ethylheptyl group, 1-propylhexyl group, 1-isobutyl-3-methylbutyl group, neopentyl group, tert-butyl group, tert-hexyl group, tert-amyl group and tert-octyl group; and cycloalkyl groups such as cyclohexyl group, 4-methylcyclohexyl group, 4-ethylcyclohexyl group, 4-tert-butylcyclohexyl group, 4-(2- ethylhexyl)cyclohexyl group, bornyl group, isobonyl group and adamantyl group. Of these, those having 1 to 8 carbon atoms are preferable.

Each of these alkyl groups may be substituted by a hydroxyl group, a halogen atom, a nitro group, a carboxyl group, a cyano group or the like or may be substituted by an aryl group, a heterocyclic group or the like that may have a specific substituent group (for example, may be substituted by a halogen atom or a nitro group). Further, each of these alkyl groups may be substituted by another hydrocarbon group such as any one of the alkyl groups via a hetero atom such as an oxygen atom, a sulfur atom, and a nitrogen atom.

Examples of the alkyl group substituted by the another hydrocarbon group via an oxygen atom include alkyl groups substituted by an alkoxy group, an aryloxy group or the like, such as methoxymethyl group, methoxyethyl group, ethoxymethyl group, ethoxyethyl group, buthoxyethyl group, ethoxyethoxyethyl group, phenoxyethyl group, methoxypropyl group, and ethoxypropyl group. Each of the alkoxy group and the aryloxy group may have a substituent group.

Examples of the alkyl group substituted by the another hydrocarbon group via a sulfur atom include alkyl groups substituted by an alkylthio group, an arylthio group or the like, such as methylthioethyl group, ethylthioethyl group, ethylthiopropyl group, and phenylthioethyl group. Each of the alkylthio group and the arylthio group may have a substituent group.

Examples of the alkyl group substituted by the another hydrocarbon group via a nitrogen atom include alkyl groups substituted by an alkylamino group, an arylamino group or the like such as dimethylaminoethyl group, diethylaminoethyl group, diethylaminopropyl group, and phenylaminomethyl group. Each of the alkylamino group and the arylamino group may have a substituent group.

The alkenyl group preferably has 2 to 6 carbon atoms. Specific examples thereof include vinyl group, allyl group, 1-propenyl group, methacryl group, crotyl group, 1-butenyl group, 3-butenyl group, 2-pentenyl group, 4-pentenyl group, 2-hexenyl group, 5-hexenyl group, 2-heptenyl group, and 2-octenyl group. Examples of the substituent group of the alkenyl group are the same ones as described in the alkyl groups.

Specific examples of the aryl group include phenyl group, naphthyl group, anthranil group, fluorenyl group, phenalenyl group, phenanthranil group, triphenylenyl group, and pyrenyl group.

For the alkylene group and the alkenylene group, the above-mentioned alkyl groups and alkenyl groups from each of which one hydrogen atom is removed are exemplified.

For the allylene group, the above-mentioned aryl groups from each of which one hydrogen atom is removed are exemplified.

The aryl group and the allylene group may be respectively substituted by an alkyl group, an alkenyl group, a hydroxyl group, a halogen atom, a nitro group, a carboxyl group, a cyano group, a trifluoromethyl group, an aryl group that may have a specific substituent group (for example, may be substituted by a halogen atom or a nitro group), or a heterocyclic group that may have a specific substituent group (for example, may be substituted by a halogen atom or a nitro group). Here, for the alkyl group, the alkenyl group, and the aryl group, the same ones as described above are exemplified. For the halogen atom, those described below are exemplified.

Specific examples of the heterocyclic group include furyl group, thienyl group, pyrroly group, benzofuranyl group, isobenzofuranyl group, benzothienyl group, indolynyl group, isoindlynyl group, calbazolyl group, pyridyl group, piperidyl group, quinolyl group, isoquinolyl group, oxazolyl group, isooxyazolyl group, thiazolyl group, isothiazolyl group, imidazolyl group, pyrazolyl group, benzimidazolyl group, pyrazyl group, pyrimidinyl group, pyridazinyl group, and quinoxalinyl group.

The heterocyclic group may be substituted by a hydroxyl group may be substituted by a hydroxyl group, an alkyl group, a halogen atom, a nitro group, a carboxyl group, a cyano group, an aryl group that may have a specific substituted group (for example, may be substituted by a halogen atom or a nitro group), or a heterocyclic group or the like that may have a specific substituent group (for example, may be substituted by a halogen atom or a nitro group), and may also be substituted by a hydrocarbon group such as the above-mentioned alkyl group via a hetero atom such as an oxygen atom, a sulfur atom and a nitrogen atom. Here, for the alkyl group, the alkenyl group, and the aryl group, the same ones as described above are exemplified. For the halogen atom, the same ones as described below are exemplified.

Specific examples of the halogen atom include fluorine atoms, chlorine atoms, bromine atoms, and iodine atoms.

The alkoxy group that may have a substituent group is not particularly limited as long as it is an alkoxy group in which an alkyl group that may have a substituent group is directly bound to an oxygen atom. For specific examples of the alkyl group and the substituent group, the above-mentioned specific examples thereof can be exemplified.

The aryloxy group that may have a substituent group is not particularly limited as long as it is an aryloxy group in which an aryl group that may have a substituent group is directly bound to an oxygen atom. For specific examples of the aryl group and the substituent group, the above-mentioned specific examples thereof can be exemplified.

The alkylthio group that may have a substituent group is not particularly limited as long as it is an alkylthio group in which an alkyl group that may have a substituent group is directly bound to a sulfur atom. For specific examples of the alkyl group and the substituent group, the above-mentioned specific examples thereof can be exemplified.

The arylthio group that may have a substituent group is not particularly limited as long as it is an arylthio group in which an aryl group that may have a substituent group is directly bound to a sulfur atom. For specific examples of the aryl group and the substituent group, the above-mentioned specific examples thereof can be exemplified.

The alkylamino group that may have a substituent group is not particularly limited as long as it is an alkylamino group in which an alkyl group that may have a substituent group is directly bound to a nitrogen atom. For specific examples of the alkyl group and the substituent group, the above-mentioned specific examples thereof can be exemplified. Further, alkyl groups may be bound to each other to form a ring which contains an oxygen atom or a nitrogen atom, like a piperidino group, morpholino group, pyrrolidinyl group, piperazinyl group, indolinyl group, and isoindolynyl group.

The arylamino group that may have a substituent group is not particularly limited as long as it is an arylamino group in which an aryl group that may have a substituent group is directly bound to a nitrogen atom. For specific examples of the aryl group and the substituent group, the above-mentioned specific examples thereof can be exemplified.

The alkylcarbonyl group that may have a substituent group is not particularly limited as long as it is an alkylcarbonyl group in which an alkyl group that may have a substituent group is directly bound to carbon atoms of a carbonyl group.

For specific examples of the alkyl group and the substituent group, the above-mentioned specific examples thereof can be exemplified.

The arylcarbonyl group that may have a substituent group is not particularly limited as long as it is an arylcarbonyl group in which an aryl group that may have a substituent group is directly bound to carbon atoms of a carbonyl group. For specific examples of the aryl group and the substituent group, the above-mentioned specific examples thereof can be exemplified.

The alkoxycarbonyl group that may have a substituent group is not particularly limited as long as it is an alkoxycarbonyl group in which an alkyl group that may have a substituent group is directly bound to an oxygen atom. For specific examples of the alkyl group and the substituent group, the above-mentioned specific examples thereof can be exemplified.

The aryloxycarbonyl group that may have a substituent group is not particularly limited as long as it is an aryloxycarbonyl group in which an aryl group that may have a substituent group is directly bound to an oxygen atom. For specific examples of the aryl group and the substituent group, the above-mentioned specific examples thereof can be exemplified.

The alkylcarboxamide group that may have a substituent group is not particularly limited as long as it is an alkylcarboxamide group that may have a substituent group is directly bound to carbon atoms of a carboxamide. For specific examples of the alkyl group and the substituent group, the above-mentioned specific examples can be exemplified.

The arylcarboxamide group that may have a substituent group is not particularly limited as long as it is an arylcarboxamide group in which an aryl group that may have a substituent group is directly bound to carbon atoms of a carboxamide. For specific examples of the aryl group and the substituent group, the above-mentioned specific examples thereof can be exemplified.

The alkylcarbamoyl group that may have a substituent group is not particularly limited as long as it is an alkylcarbamoyl group in which an alkyl group that may have a substituent group is directly bound to nitrogen atoms of a carbamoyl group. For specific examples of the alkyl group and the substituent group, the above-mentioned specific examples thereof can be exemplified. Further, alkyl groups may be bound to each other to form a ring which contains an oxygen atom or a nitrogen atom, like a piperidino group, morpholino group, pyrrolidinyl group, piperazinyl group, indolinyl group, and isoindolynyl group.

The arylcarbamoyl group that may have a substituent group is not particularly limited as long as it is an arylcarbamoyl group in which an aryl group that may have a substituent group is directly bound to nitrogen atoms of a carbamoyl group. For specific examples of the aryl group and the substituent group, the above-mentioned specific examples thereof can be exemplified.

The alkylsulfamoyl group that may have a substituent group is not particularly limited as long as it is an alkylsulfamoyl group in which an alkyl group that may have a substituent group is directly bound to nitrogen atoms of a sulfamoyl group. For specific examples of the alkyl group and the substituent group, the above-mentioned specific examples thereof can be exemplified.

Metal component of the formazan metal chelate compound are not particularly limited as long as it is a metal or a metal compound that can form formazan and chelate. Examples thereof include titanium, vanadium, chrome, manganese, iron, cobalt, nickel, copper, zinc, zirconium, niobium, molybdenum, technetium, ruthenium, rhodium, palladium, oxides thereof and halides thereof. Of these, in terms that the optical recording medium can exhibit excellent optical properties, vanadium, manganese, iron, cobalt, nickel, copper, zinc, and palladium are particularly preferable. For the halides, chlorides are preferable.

In the present invention, the thermal decomposition temperature of an organic dye in the recording layer is preferably in the range of 150° C. to 300° C. When the thermal decomposition temperature is more than 300° C., the recording sensitivity of the recording layer may degrade, and in particular, high-speed recording properties are hardly obtained. In the meanwhile, when the thermal decomposition temperature is less than 150° C., thermal stability of the optical recording medium may degrade and recording marks may easily widen. Here, the thermal decomposition temperature of the organic dye can be easily measured by using a general-purpose thermobalance.

The layer thickness of a second recording layer of the single sided two-layer optical recording medium is preferably 40 nm to 100 nm (400 angstroms to 1,000 angstroms) and more preferably 50 nm to 80 nm. When the layer thickness of the second recording layer is less than 40 nm, excellent jitter properties and excellent modulation degrees may not be obtained. When the layer thickness is more than 100 nm, cross-talk may be likely to increase, and a jitter value may be likely to increase. Further, a ratio (thickness of recording guide groove portions/thickness of recording inter-guide groove portions) the thickness of the second recording layer at guide groove portions and the thickness of the second recording layer at the inter-guide groove portions is preferably in the range of 80% to 100%.

Figure 2:
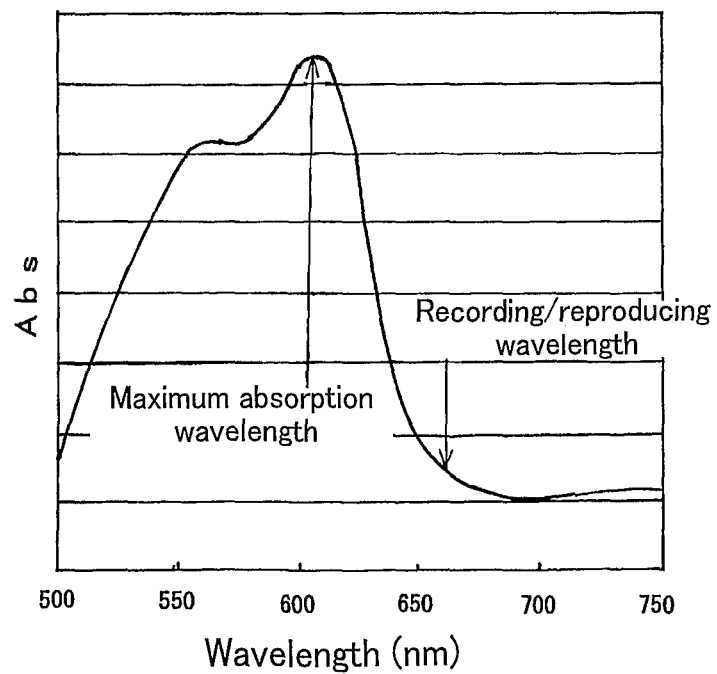
FIG. 2 is a graph showing a relation between an absorption spectrum of a dye used in a recording layer and a recording and reproduction wavelength.

Light absorption performance of the recording layer can be controlled by adjusting the layer thickness of the recording layer and varying light absorption properties, however, in the optical recording medium of the present invention, as shown in FIG. 2, a maximum absorption wavelength or an absorption peak wavelength of the organic dye in the recording layer is preferably 580 nm to 630 nm. When the maximum absorption wavelength or the absorption peak wavelength of the organic dye in the recording layer is within the range, it is preferable in terms of recording sensitivity and reflectance.

The protective layer to be formed on the second recording layer also has an effect as a barrier layer to protect the recording layer from the intermediate layer, and thus two or the substrates can be easily laminated using an adhesive capable of dissolving an organic dye as the intermediate layer.

Preferred examples of materials used for the protective layer include inorganic materials having high-optical transparency such as SiO, $SiO_2$, Si—N, $MgF_2$, $SnO_2$, SnS, ZnS, and ZnS—$SiO_2$. Of these, materials mainly containing ZnS which has low-crystallinity and has a high-refractive index are particularly preferable.

Preferred examples of the material mainly containing ZnS include, besides ZnS—$SiO_2$, ZnS—SiC, ZnS—Si, ZnS—Ge, ZnS—ZnO—GaN, and ZnS—ZnO—$In_2O_3$—$Ga_2O_3$. A ZnS content ratio in the material mainly containing ZnS is preferably 60 mol % to 90 mol % in terms of crystallinity.

The layer thickness of the protective layer is not particularly limited and may be suitably selected in accordance with the intended use, however, when a material having a high-refractive index (n>2) is selected, a peak variation in reflectance occurs depending on the layer thickness of the protective layer, and thus it is preferable to select a layer thickness with which a reflectance near the reflection peak can be obtained. Specifically, the layer thickness of the material mainly containing ZnS is preferably 5 nm to 30 nm and more preferably 80 nm to 180 nm. Within the above-mentioned layer thickness range, a satisfactory reflectance and a satisfactory recording signal modulation degree (contrast) can be obtained.

The guide groove depth of the second substrate is preferably 20 nm to 60 nm (200 angstroms to 600 angstroms). By setting the guide groove depth to 20 nm to 60 nm, light attenuation caused by the presence of a guide groove formed on the second substrate can be easily prevented, and a second recording layer having a high-reflectance can be easily obtained.

Figure 3:
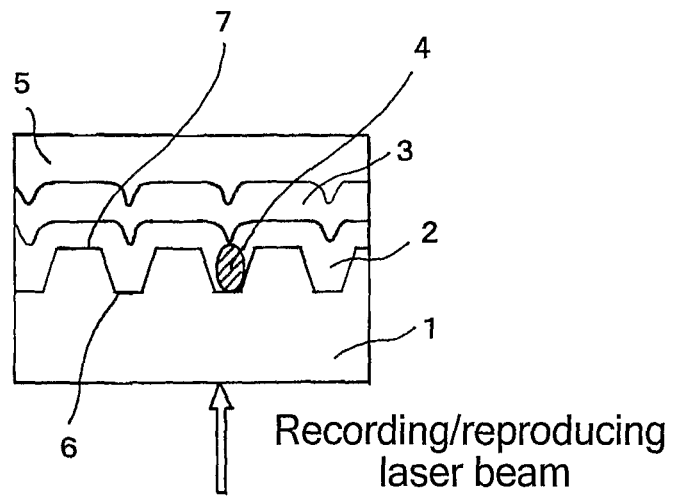
FIG. 3 is a view showing one example of a layer structure of the first information layer of the optical recording medium of the present invention.
Figure 4:
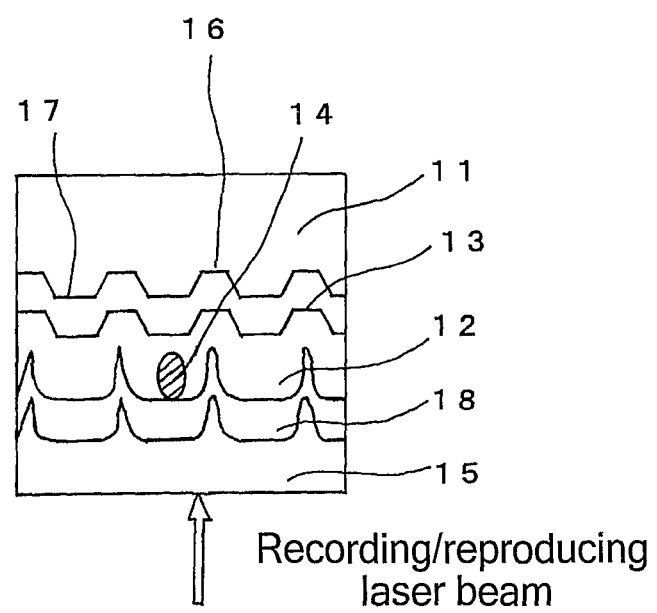
FIG. 4 is a view showing one example of a layer structure of the second information layer of the optical recording medium of the present invention.

Here, FIG. 3 and FIG. 4 respectively show a layer structure of an information layer of the single-sided two-layer optical recording medium of the present invention. FIG. 3 is a view schematically showing a layer structure of the first information layer, and FIG. 4 is a view schematically showing a layer structure of the second information layer.

In FIG. 3, a recording mark forming portion 4 (mark forming portion) on a first information layer is formed in a groove portion (substrate groove portion) 6 of a first substrate 1. Note that as described above, a single-sided single layer optical recording medium has a layer structure similarly to the first information layer of the single-sided two-layer optical recording medium and has a layer structure in which a first information layer and a dummy substrate are laminated via an adhesive.

In FIG. 4, a recording mark forming portion 14 on a second information layer is formed in an inter-guide groove site (substrate inter-guide groove portion) 17 of a second substrate 11.

As illustrated in FIG. 3 and FIG. 4, the shape of groove formed on the first substrate 1 is different from the shape of groove formed on the second substrate 11. For example, in the case of a DVD+R or a DVD-R having a storage capacity of 4.7 GB and a groove pitch of 0.74 μm, a groove depth of a groove formed on the first substrate is preferably 150 nm to 200 nm (1,500 angstroms to 2,000 angstroms), and a groove width (bottom width) thereof is preferably 0.1 μm to 0.35 μm. When the groove depth and the groove width of the groove formed on the first substrate are respectively within the range, it is preferable in terms that interface reflection can be utilized. The reason is that as shown in FIG. 3, in the case of forming a layer by spin-coating, the inside of the groove tends to be filled up with a dye used in a layer coating solution, the interfacial surface shape between the first recording layer and the reflective layer are determined by the fill ration and the groove shape of the substrate, and thus by forming a groove within the above-mentioned range on the first substrate, interface reflection can be utilized. A single-sided single-layer optical recording medium allows for having the same design as that of the first substrate.

A groove depth of a groove formed on the second substrate is preferably 20 nm to 60 nm (200 angstroms to 600 angstroms), and a groove width (bottom width) thereof is preferably 0.1 μm to 0.35 μm. By forming a groove within the above-mentioned range on the second substrate, it is possible to inhibit reflected light attenuation caused due to uneven height of the groove formed on the second substrate, and thus a second recording layer having a high-reflectance can be easily obtained. As shown in FIG. 4, the interfacial surface shape between the second recording layer and the reflective layer is determined by the groove shape of the second substrate. When the groove depth and the groove width of the groove formed on the second substrate are respectively within the range, it is preferable in terms that interface reflection can be utilized.

Further, in view of the recording and reproducing wavelength of DVD (about 650 nm), the groove width (bottom width) of the second substrate is preferably 0.1 μm to 0.35 μm. When the groove width of the second substrate is less than 0.1 μm or more than 0.35 μm, the shape of recording marks may easily become nonuniform and the jitter value may easily increase.

Next, a layer structure of the single-sided two-layer optical recording medium of the present invention will be described below with reference to the accompanying drawings.

Figure 5:
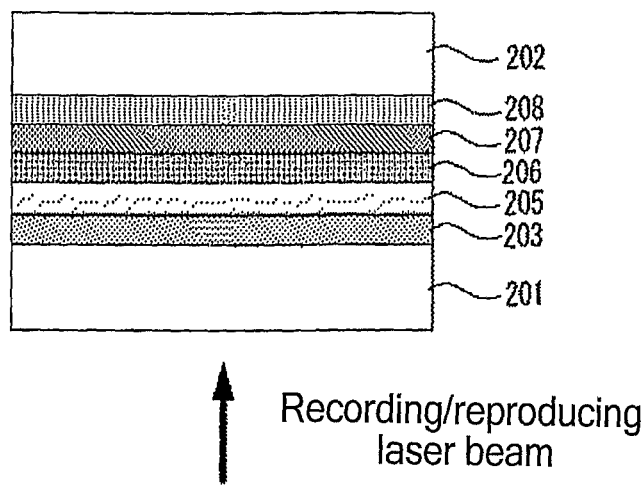
FIG. 5 is a view showing one example of a layer structure of the optical recording medium of the present invention.

FIG. 5 shows one example of a layer structure of the optical recording medium according to the first embodiment of the present invention. In this example, a first recording layer 203 is a reproduction-only recording layer, and a second recording layer 207 is a recording and reproducing recording layer. In FIG. 5, the optical recording medium is composed of a first substrate 201, a second substrate 202, the first recording layer 203 composed of a reproduction-only reflective film, an intermediate layer 205, a protective layer 206, the second recording layer containing an organic dye 207, and a second reflective layer 208. Any one of recording and reproducing is performed by means of a laser beam irradiated from the first substrate surface side.

Figure 6:
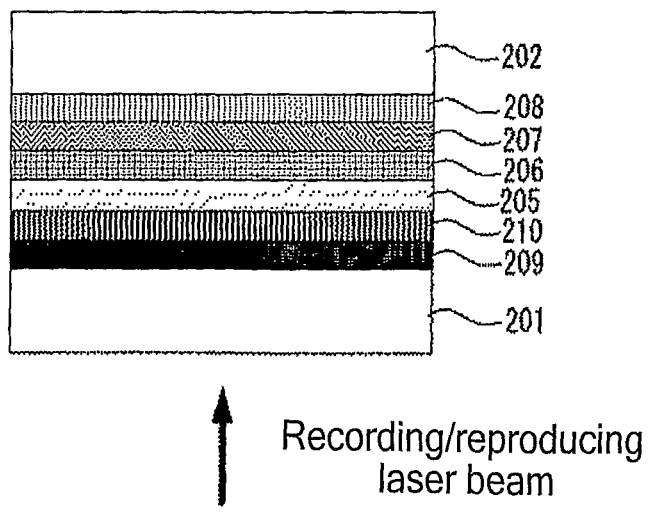
FIG. 6 is a view showing one example of another layer structure of the optical recording medium of the present invention.

FIG. 6 shows one example of a layer structure of the optical recording medium according to the second embodiment of the present invention. In this example, both a first recording layer 209 and a second recording layer 207 are used for recording and reproducing. In FIG. 6, the optical recording medium is composed of a first substrate 201, the first recording layer containing an organic dye 209, a first reflective layer 210, a second substrate 202, an intermediate layer 205, a protective layer 206, the second recording layer containing an organic dye 207, and a second reflective layer 208. Any one of recording and reproducing is performed by means of a laser beam irradiated from the first substrate surface side.

Note that in the present invention, the optical recording media shown in FIG. 5 and FIG. 6 may also be structured as an optical recording medium of a single-layer recording layer, namely, without having the first recording layer.

The optical recording medium of the present invention has a configuration, similarly to those of DVD+R and CD-R, of which a high-reflectance can be obtained by multiple interference of both interfacial surfaces of the organic dye-containing recording layers (dye recording layers). These recording layers preferably have optical properties in which a refractive index n is high and an attenuation coefficient k is relatively low. It is particularly preferable that the refractive index and the attenuation satisfy the expressions, $n>2$, and $0.03<k<0.2$. Such optical properties can be obtained by utilizing properties of the long-wavelength end of the absorption band of the dye recording layers.

—Recording Layer—

For the above-mentioned recording layer, as the first recording layer in the first information layer, a recording layer composed of a reflective film of reproduction-only, and a recording layer containing an organic dye are exemplified. Further, the second recording layer in the second information layer, as described above, contains a cyanine compound (A) and a squarylium compound (I).

In an optical recording material used for the second recording layer, the total weight of the cyanine compound (A) and the squarylium compound (I) is preferably 50% by weight or more to the total weight of the optical recording material. When the total weight of the cyanine compound (A) is less than 50% by weight, it is difficult to maintain a high-speed recording performance and durability.

Further, the optical recording material used for the second recording layer may contain materials other than the cyanine compound (A) and the squarylium compound (I). Suitable materials will be described below.

The reflective film is a film composed of a metal or an alloy that is similar to reflective layer materials to be hereinafter described, and information pits are formed thereon.

It is preferable the organic dye in the first recording layer contain, as just in the caser of the second recording layer, a cyanine compound (A) and a squarylium compound (I), and may contain other materials in accordance with the intended use. Examples of the other materials include cyanine dyes, tetraazapolphyrazin dyes, phthalocyanine-based dyes, pyrylium-based/thio pyrylium-based dyes, azulenium-based dyes, squarylium-based dyes, squarylium metal chelate compounds, formazan chelate-based dyes, metal complex-based dyes such as Ni and Cr, naphthoquinone-based/anthraquinone-based dyes, indophenol-based dyes, indoaniline-based dyes, triphenylmethane-based dyes, triallyl methane-based dyes, aluminum-based/diimmonium-based dyes, and nitroso compounds. Each of these organic dyes may be used alone or in combination with two or more. These organic dyes can be added in the second recording layer where necessary.

Of these organic dyes, at least one selected from tetraazapolphyrazin dyes, cyanine-based dyes, azo-based dyes, squarylium-based dyes, squarylium metal chelate compounds and formazan chelate-based dyes is preferable in terms that a maximum absorption wavelength of light absorption spectrum or an absorption peak wavelength of the organic dye-containing recording layer is within the range of 580 nm to 630 nm, desired optical properties can be easily obtained with a laser beam wavelength (about 650 nm), and the layer formability and the optical properties can be easily controlled by application of a solvent.

The layer thickness of the first recording layer is preferably 10 nm to 500 nm (100 angstroms to 5,000 angstroms) and more preferably 40 nm to 80 nm (400 angstroms to 800 angstroms). When the layer thickness of the first recording layer is less than 10 nm, the recording sensitivity may degrade, and when more than 500 nm, the reflectance may be lowered.

The first recording layer can be formed by a commonly used method such as evaporation method, sputtering method, CVD (Chemical Vapor Deposition) method, and solution application method, and can be produced by a method of producing an optical recording medium, which will be described below.

Further, the first recording layer and the second recording layer may further contain other components in accordance with necessity, for example, a polymer material, a stabilizer, a dispersing agent, a flame retardant, a lubricant, an antistatic agent, a surfactant, a plasticizer and the like.

For the polymer material, for example, various materials such as an ionomer resin, a polyamide-based resin, a vinyl resin, a natural polymer, silicone, liquid rubber, a silane coupling agent and the like may be dispersed and mixed therein for use. Examples of the stabilizer include transition metal complexes.

The second recording layer can also be formed by a commonly used method such as evaporation method, sputtering method, CVD (Chemical Vapor Deposition) method, and solution application method, and can be produced by a method of producing an optical recording medium, which will be described below.

—Substrate—

The substrate must be transparent to a used laser beam only when any one of recording and reproducing is performed from a substrate surface side. When any one of recording and reproducing is performed from a recording layer side, the substrate is unnecessary to be transparent. Thus, in the present invention, since a laser beam having a recording wavelength of 580 nm to 720 nm is irradiated from the first substrate surface side, the second substrate may be transparent or opaque to a used laser beam as long as the first substrate is transparent.

A material used for the substrates is not particularly limited and may be suitably selected in accordance with the intended use. For example, a plastic such as polyester resin, acrylate resin, polyamide resin, polycarbonate resin, polyolefin resin, phenol resin, and epoxy resin; a glass, a ceramics, a metal or the like can be used.

The substrates are usually formed in a disc shape. The track pitch of the substrates is preferably 0.7 μm to 1.0 μm, and in the case of application for DVD storage capacity, the track pitch is about 0.74 μm.

—Reflective Layer—

For a material used for the reflective layer, a material that can exhibit a high-reflectance to a used laser beam is preferable. Examples of such a material include metals or semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ca, In, Si, Ge, Te, Pb, Po, Sn, Si and SiC. Of these, Au, Al and Ag are particularly preferable in terms that a high-reflectance can be obtained. Each of these materials may be used alone or in combination with two or more or may be used as an alloy.

Generally, the layer thickness of the reflective layer is preferably 5 nm to 300 nm (50 angstroms to 3,000 angstroms), and when the reflective layer is used as a semitransparent layer for the first recording layer, the layer thickness is preferably 5 nm to 30 nm (50 angstroms to 300 angstroms) and more preferably 10 nm to 15 nm (100 angstroms to 150 angstroms). When the first recording layer is a reflective film of reproduction-only and is a recording layer containing an organic dye and a reflective layer is further formed thereon, it is preferable to adjust the layer thickness of the reflective layer so as to have a light transmittance of 40% or more. When the reflective layer has a thinner thickness, it is preferable in that the light transmittance hardly attenuates. In order to secure the durability within the above-mentioned layer thickness range, it is preferable to use an alloy in which the reflective layer is composed of a material mainly containing Ag, which has the highest reflection effect, and a slight amount of a metal such as Nd, Cu, Pd and In is added to Ag. Generally, the additive amount of the metal is preferably around 0.2% by mass to 2% by mass.

The layer thickness of the reflective layer (a second reflective layer) is not particularly limited and may be suitably selected in accordance with the intended use, and it is preferably 100 nm to 300 nm (1,000 angstroms to 3,000 angstroms).

—Hard Coat Layer to be Formed on Substrate Surface—

The hard coat layer to be formed on s substrate surface is used for the purposes of (1) protecting the recording layer (reflection absorption layer) from scratch, dust, smear and the like, (2) increasing the storage stability of the recording layer (reflection absorption layer), (3) and increasing the reflectance. To accomplish these purposes, the inorganic material or the organic material as described in the undercoat layer can be used. For the organic material, for example, SiO, $SiO_2$ etc. are preferably used. For the organic material, for example, thermosoftening resins, hot-melt resins and ultraviolet curable resins such as polymethyl acrylate resins, polycarbonate resins, epoxy resins, polystyrene resins, polyester resins, vinyl resins, celluloses, aliphatic hydrocarbon resins, aromatic hydrocarbon resins, natural rubbers, styrene butadiene resins, chloroprene rubbers, waxes, alkyd resins, drying oils and rosins are preferably used. Of these materials, the ultraviolet curable resins are particularly preferable as the hard coat layer to be formed on the substrate surface in terms of its excellence in productivity. The ultraviolet curable resins are also particularly preferable as the protective layer in terms of its excellence in productivity.

The layer thickness of the hard coat layer to be formed on the substrate surface is not particularly limited and may be suitably selected in accordance with the intended use, and it is preferably 0.01 µm to 30 µm and more preferably 0.05 µm to 10 µm.

—Intermediate Layer—

A material used for the intermediate layer is not particularly limited as long as it is a transparent material capable of bonding the first information layer and the second information layer, and may be suitably selected in accordance with the intended use. However, in view of productivity, it is preferable to use an acrylate-based, epoxy-based, urethane-based ultraviolet curable adhesive or thermoset adhesive; a hot-melt adhesive or the like.

The layer thickness of the intermediate layer is not particularly limited and may be suitably selected in accordance with optical conditions for a used recording and reproducing system. When a DVD system is used, the layer thickness of the intermediate layer is preferably 40 µm to 70 µm.

—Undercoat Layer—

The undercoat layer is used for the purposes of (1) increasing adhesion property, (2) blocking intrusion of water, gas or the like, (3) increasing the storage stability of the recording layer, (4) increasing the reflectance, (5) protecting the substrate and the recording layer from solvents, and (6) forming a guide groove, guide pit or preformat.

For the purpose of (1) descried above, it is possible to use a polymer material, for example, various polymer materials such as ionomer resin, polyamide resin, vinyl resin, natural resin, natural polymer, silicone, and liquid rubber, or a silane coupling agent. For the purposes of (2) and (3) described above, it is possible to use, besides the above-mentioned polymer materials, inorganic compounds, for example, $SiO_2$, $MGF_2$, $SiO$, $TiO_2$, $ZnO$, $TiN$, and $SiN$; and further to use a metal or semi-metal, for example, Zn, Cu, Ni, Cr, Ge, Se, Au, Ag and Al. For the purpose of (4) described above, it is possible to use a metal, for example, Al, Ag and the like, or to use an organic thin film having metal glossiness, for example, methyne dye, xanthene dye and the like. For the purposes of (5) and (6) described above, it is possible to use an ultraviolet curable resin, a thermosetting resin, a thermoplastic resin or the like.

The layer thickness of the undercoat layer is not particularly limited and may be suitably selected in accordance with the intended use, and it is preferably 0.01 µm to 30 µm and more preferably 0.05 µm to 10 µm.

In the present invention, as just in the case of the recording layer, each of the undercoat layer, the protective layer and the hard coat layer to be formed on a substrate surface may contain other components in accordance with necessity, such as a stabilizer, a dispersing agent, a flame retardant, a lubricant, an antistatic agent, a surfactant, a plasticizer and the like.

(Example of Method for Producing Optical Recording Medium)

The method for producing a single-sided two-layer optical recording medium of the present invention includes at least a first information layer forming step, a second information layer forming step and a laminating step and further includes other steps in accordance with necessity.

<First Information Layer Forming Step>

The first information layer forming step includes at least a first reflective layer forming step and a first recording layer forming step and further includes other steps in accordance with the intended use. A substrate with the first recording layer formed thereon can be produced in similar processes to those of conventional DVDs+R and DVDs-ROM.

—First Recording Layer Forming Step—

The first recording layer forming step is a step in which a first recording layer coating solution containing an organic dye is applied over the surface of a first substrate on which at least any one of groove and pits are formed, and the applied coating solution is dried to form a first recording layer. The organic dye contains a cyanine compound (A) and a squarylium compound (I).

Examples of the method of applying the first recording layer coating solution include spinner coating method, spray coating method, roller coating method, dipping method and spin-coating method. Of these, spin-coating method is desirable from the viewpoint that the layer thickness can be controlled by adjusting the concentration and viscosity of the first recording layer coating solution and the dry temperature of a used solvent.

The organic solvent used in the coating is not particularly limited and may be suitably selected in accordance with the intended use. Examples thereof include alcohols such as methanol, ethanol, isopropyl alcohol, and 2,2,3,3-tetrafluoropropanol; ketones such as acetone, methylethylketone, cyclohexanon; amides such as N,N-dimethylformamide, N,N-dimethylacetoamide; sulfoxides such as dimethylsulfoxide; ethers such as tetrahydrofuran, dioxane, diethyl ether, and ethylene glycol monomethylether; esters such as methyl acetate, ethyl acetate; aliphatic halogenated hydrocarbons such as chloroform, methylene chloride, dichloroethane, and carbon tetrachloride; aromatic compounds such as benzene, xylene, monochlorobenzene, and dichlorobenzene; cellosolves such as methoxy ethanol, and ethoxy ethanol; and hydrocarbons such as hexane, pentane, cyclohexane and methyl cyclohexane. Further, it is preferable to subject the dried coating solution to an annealing treatment to completely remove a residual solvent remaining in the recording layer. The annealing temperature is 60° C. to 100° C.

—First Reflective Layer Forming Step—

The first reflective layer forming step is a step in which a reflective layer is formed on the first recording layer by a film formation method. Examples of the film formation method include vacuum evaporation method, sputtering method, plasma CVD method, optical CVD method, ion-plating method, and electron-beam deposition method. Of these methods, sputtering method is preferable in terms of its excellence in mass-productivity and film quality.

<Second Information Layer Forming Step>

The second information layer forming step includes at least a second reflective layer forming step, a second recording layer forming step and a protective layer forming step, and further includes other steps in accordance with necessity. A substrate with the second recording layer formed thereon can be produced in similar processes to those of conventional DVDs+R and DVDs-ROM.

—Second Reflective Layer Forming Step—

The second reflecting layer forming step is a step in which a reflective layer is formed by a film formation method on the surface of a second substrate on which at least any one of groove and pits are formed.

Examples of the film formation method include vacuum evaporation method, sputtering method, plasma CVD method, optical CVD method, ion-plating method, and electron-beam deposition method. Of these methods, sputtering method is preferable in terms of its excellence in mass-productivity and film quality.

—Second Recording Layer Forming Step—

The second recording layer forming step is a step in which a second recording layer coating solution containing a cyanine compound (A) and a squarylium compound (I) is applied over the surface of the second reflective layer, and the applied coating solution is dried to form a second recording layer.

A method of applying the second recording layer coating solution is the same as that described above in the first recording layer.

—Protective Layer Forming Step—

The protective layer forming step is a step in which a protective layer is formed on the second recording layer. Examples of a method of forming the protective layer include vacuum evaporation method, sputtering method, plasma CVD method, optical CVD method, ion-plating method, and electron beam deposition method. Of these, sputtering method is preferable in terms of its excellence in mass-productivity and film quality.

<Laminating Step>

The laminating step is a step in which the first information layer and the second information layer are laminated to each other via an intermediate layer so that the first recording layer and the second recording layer respectively face the inside.

It is preferable that an adhesive be delivered by drops to the surface of the second information layer with the protective layer formed thereon, the first information layer be placed on the second information layer with spreading uniformly spreading the adhesive, and then the first and second information layers be cured by ultraviolet irradiation. It is preferable to use an UV curable adhesive capable of being cured by ultraviolet irradiation in terms of obtaining high-light transmittance.

Examples of the other steps include undercoat layer forming step and a hard coat layer forming step.

(Method for Recording and Reproducing Optical Recording Medium)

The method for recording and reproducing an optical recording medium of the present invention includes performing at least any one of recording and reproducing signal information stored in the first recording layer and the second recording layer by irradiating the optical recording medium of the present invention with a laser beam having a recording wavelength of 580 nm to 720 nm.

Specifically, an optical recording medium of the present invention is irradiated with a recording light beam (for example, a laser beam having an oscillation wavelength of 650 nm) via an object lens while rotating the optical recording medium at a predetermined linear velocity or a predetermined constant angular velocity. By the irradiation of light beam, the first recording layer and the second recording layer respectively absorb the light to locally increase the temperature thereof, for example, pits are formed and the optical properties of the recording layers are changed, thereby information can be recorded on the first recording layer and the second recording layer. The information recorded as described above can be reproduced by irradiating the optical recording medium with a laser beam while rotating the optical recording medium at a predetermined linear velocity from the first substrate surface side and detecting reflecting light thereof.

(Optical Recording Apparatus)

In an optical recording apparatus of the present invention, information is recorded on an optical recording medium by irradiating the optical recording medium with a laser beam from a light source, and the optical recording medium is the optical recording medium of the present invention.

The optical recording apparatus is not particularly limited and may be suitably selected in accordance with the intended use. For example, the optical recording apparatus is equipped with a laser light source such as a semiconductor laser that emits a laser beam, a condenser lens configured to condense the laser beam emitted from the laser light source to an optical recording medium mounted on a spindle, a laser beam photodetector configured to detect part of the laser beam emitted from the laser light source, and an optical device configured to lead the laser beam emitted from the laser light source to the condenser lens and the laser beam photodetector, and is further equipped with other units in accordance with necessity.

In the optical recording apparatus, a laser beam emitted from a laser light source is led to a condenser lens by means of an optical device, the laser beam is condensed and irradiated by the condenser lens onto an optical recording medium to thereby record information on the optical recording medium. At this point in time, the optical recording apparatus leads part of the laser beam emitted from the laser light source to the laser photodetector and controls the quantity of light of the laser light source based on the detected amount of laser beam by the laser photodetector.

The laser photodetector is configured to convert a detected amount of laser beam into a voltage or a current and to output it as a detected amount signal.

Examples of the other units include a controlling unit. The controlling unit is not particularly limited as long as it can control operations of each of the above-mentioned units, and may be suitably selected in accordance with the intended use. Examples thereof include equipment such as sequencers and computers.

Since the optical recording apparatus of the present invention allows for obtaining excellent recording signal properties and uses an optical recording medium of the present invention capable of preventing cross-talk amount between recording marks, information can be stably recorded at a high-reflectance and with a high-modulation degree.

EXAMPLES

Hereinafter, the present invention will be further described in detail with reference to specific Examples, however, the present invention is not limited to the disclosed Examples.

Preparation of Optical Recording Medium and Evaluation of Recording Properties

Example 1

A second substrate composed of a polycarbonate resin having a diameter of 120 mm and a thickness of 0.57 mm with a convexoconcave pattern of a guide groove having a depth of 33 nm, a groove width (bottom width) of 0.25 μm and a track pitch of 0.74 μm was prepared. On the second substrate, a second reflective layer composed on AgIn (Ag/In=99.5/0.5) having a thickness of about 140 nm was formed by sputtering using Ar as a sputtering gas. Next, the surface of the AgIn reflective layer was spin-coated with a coating solution in which a cyanine compound (A) and a squarylium metal chelate compound represented by Compound No. 8 as shown in Table 1 were dissolved in 2,2,3,3-tetrafluoropropanol to thereby form a second recording layer having a thickness of about 80 nm on the AgIn reflective layer. The mixing weight ratio (A/No. 8) of the cyanine compound (A) to the squarylium compound (No. 8) was set at 60/40.

Next, on the second recording layer, a protective layer composed of AnS—SiC (molar ratio: ZnS/SiC=8/2) was formed by sputtering using Ar as a sputtering gas so as to have a thickness of 15 nm, thereby preparing a second information layer. In the meanwhile, on a surface of a first substrate composed of a polycarbonate resin having a diameter of 120 nm and a thickness of 0.58 mm, DVD-ROM information pits were formed. On the first substrate, a reflective layer composed of AgIn (about 99.5/0.5) was formed so as to have a thickness of 10 nm, thereby preparing a first information layer. Next, the first information layer and the second information layer were laminated to each other using an ultraviolet curable adhesive (KAYARAD DVD802, manufactured by Nippon Kayaku Co., Ltd.) to thereby prepare a two-layered optical recording medium having a layer structure as shown in FIG. 5. On the second recording layer of the obtained optical recording medium, DVD signals (8-16) were recorded under conditions of a wavelength of 659 nm, a lens NA of 0.65 and a linear velocity of 30.64 m/s (8× speed), and thereafter, the reproducing properties thereof were evaluated under DVD ROM reproduction conditions of a wavelength of 650 nm, a lens NA of 0.60 and a linear velocity of 3.83 m/s. Then, it was possible to obtain evaluation results satisfying the DVD+R standard. Specifically, the evaluation results are as follows. Reflectance after recording (I14H): 22%, modulation degree (I14/I14H): 63%, Jitter: 7.1%, and PIsum 8:50 or less. For an optical recording apparatus to evaluate recording, ODU1000 manufactured by PULSTEC INDUSTRIAL CO., LTD was used. Further, the optical recording medium with information recorded therein was stored under the environment of 80° C. and a relative humidity of 85% for 100 hours, and then PIsum 8 was measured. As a result, the PIsum8 was 8:50 or less, and it was recognized that the optical recording medium had excellent durability.

Example 2

First, in the same manner as in Example 1, on a second substrate composed of a polycarbonate resin having a diameter of 120 nm and a thickness of 0.57 mm with a convexoconcave pattern of a guide groove having a depth of 33 nm, a groove width (bottom width) of 0.25 μm and a track pitch of 0.74 μm, a second information layer was prepared. In the meanwhile, a first substrate composed of a polycarbonate resin having a diameter of 120 mm and a thickness of 0.58 mm with a convexoconcave pattern of a guide groove having a depth of 160 nm, a groove width (bottom width) of 0.25 μm and a track pitch of 0.74 μm was prepared. A surface of the first substrate was spin-coated with a coating solution in which the cyanine compound (A) and a squarylium metal chelate compound represented by Compound No. 8 as shown in Table 1 were dissolved in 2,2,3,3-tetrafluoropropanol to thereby form a first recording layer having a thickness of about 50 nm on the first substrate. The mixing weight ratio (A/No. 8) of the cyanine compound (A) to the squarylium compound (No. 8) was set at 40/60.

Next, on the first recording layer, a reflective layer composed of AgIn (99.5/0.5) having a thickness of 10 nm was formed by sputtering using Ar as a sputtering gas, thereby preparing a first information layer. Next, the first information layer and the second information layer were laminated to each other using an ultraviolet curable adhesive (KAYARAD DVD802, manufactured by Nippon Kayaku Co., Ltd.) to thereby prepare a two-layered optical recording medium having a layer structure as shown in FIG. 6. On the first recording layer and the second recording layer of the obtained optical recording medium, the recording and reproducing properties were evaluated in the same manner as in Example 1, and it was possible to obtain evaluation results satisfying the DVD+R standard on both the first recording layer and the second recording layer.

<First Recording Layer>

Reflectance (I14H) after recording: 18%, modulation degree (I14/I14H): 65%, jitter: 6.5%, and PIsum8: 8:50 or less.

<Second Recording Layer>

Reflectance (I14H) after recording: 17%, modulation degree (I14/I14H): 62%, jitter: 7.8%, and PIsum8: 8:50 or less.

Further, the optical recording medium with information recorded therein was stored under the environment of 80° C. and a relative humidity of 85% for 100 hours, and then PIsum 8 was measured. As a result, the PIsum8 was 8:50 or less, and it was recognized that the optical recording medium had excellent durability.

Example 3

An optical recording medium was prepared in the same manner as in Example 2 except that the squarylium metal chelate compound used in the second recording layer in Example 2 was changed to a squarylium compound No. 11 as shown in Table 1, and the mixing weight ratio (A/No. 11) of the cyanine compound A to the squarylium compound No. 11 was set at 15/85. On the second recording layer of the obtained optical recording medium, recording and reproducing properties were evaluated in the same manner as in Example 2. As a result, it was verified that the optical recording medium had signal properties satisfying the DVD+R standard and excellent durability. Table 2 shows the evaluation results.

Example 4

An optical recording medium was prepared in the same manner as in Example 2 except that the squarylium metal chelate compound used in the first recording layer in Example 2 was changed to a squarylium compound No. 1 as shown in Table 1, and the mixing weight ratio (A/No. 1) of the cyanine compound (A) to the squarylium compound No. 1 was set at 50/50. As a result, it was verified that the optical recording medium had signal properties satisfying the DVD+R standard and excellent durability. Table 2 shows the evaluation results.

Examples 5 to 8

Optical recording media were prepared in the same manner as in Example 2 except that the mixing ratio of the cyanine compound (A) to the squarylium metal chelate compound used in the second recording layer in Example 2 was changed to those described in Table 2. On the obtained optical recording media, recording and reproducing properties were evaluated in the same manner as in Example 2. As a result, it was verified that each of the optical recording media had signal properties satisfying the DVD+R standard and excellent durability. Table 2 shows the evaluation results.

Comparative Example 1

An optical recording medium was prepared in the same manner as in Example 2 except that in the second recording layer, only a squarylium metal chelate compound No. 1 as shown in Table 1 was used. On each of the second recording layers of the obtained optical recording medium and the optical recording medium of Example 2, DVD signals (8-16) were recorded under conditions of a wavelength of 659 nm, a lens NA of 0.65 and a linear velocity of 30.64 m/s (8× speed), and thereafter, the reproducing properties thereof were evaluated under DVD ROM reproduction conditions of a wavelength of 650 nm, a lens NA of 0.60 and a linear velocity of 3.83 m/s. Then, the recording power dependency of jitter property was evaluated. It was verified that the optical recording medium of Example 2 had more excellent jitter property than that of the optical recording medium of Comparative Example 1. Table 2 shows the results.

Comparative Example 2

An optical recording medium was prepared in the same manner as in Example 2 except that a compound represented by Structural Formula (IV) was used as a cyanine dye, a squarylium metal chelate compound No. 2 as shown in Table 1 was used instead of the squarylium metal chelate compound No. 8, and the mixing ratio (IV/No. 2) was set at 60/40 (IV/No. 2).

Figure 7:
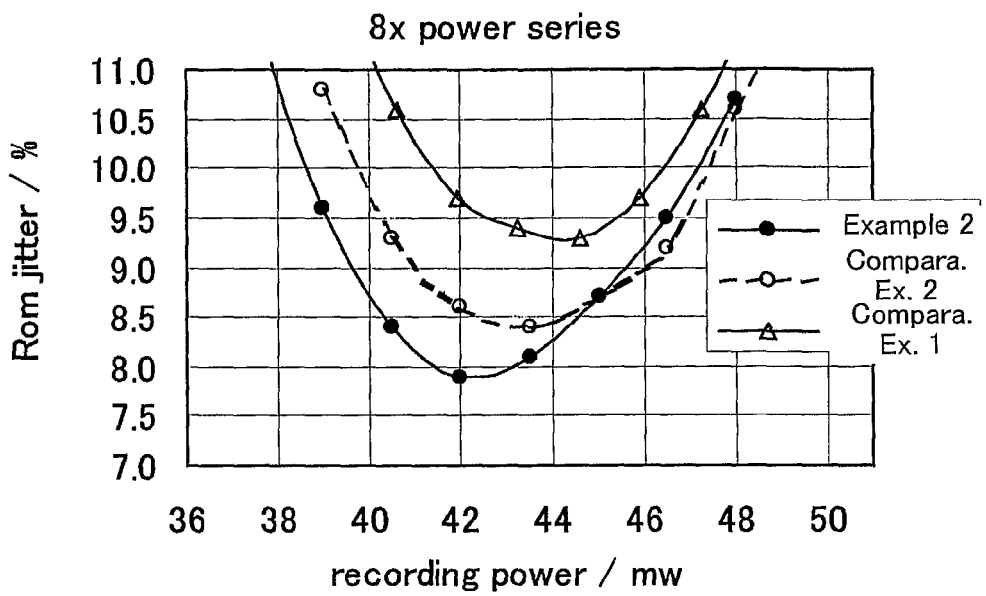
FIG. 7 is a graph showing the evaluation results of signals (dependency on recording power of jitter at the time of recording at 8× speed) in Example 2 and Comparative Examples 1 and 2.

On each of the second recording layers of the obtained optical recording medium and the optical recording medium of Example 2, DVD signals (8-16) were recorded under conditions of a wavelength of 659 nm, a lens NA of 0.65 and a linear velocity of 30.64 m/s (8× speed), and thereafter, the reproducing properties thereof were evaluated under DVD ROM reproduction conditions of a wavelength of 650 nm, a lens NA of 0.60 and a linear velocity of 3.83 m/s. Specifically, recording power dependency of jitter property was evaluated. It was verified that the optical recording medium of Example 2 had more excellent jitter property than that of the optical recording medium of Comparative Example 2. FIG. 7 shows the results. Further, the optical recording medium was inferior in durability to the optical recording medium of Example 2.

Example 9

A first substrate composed of a polycarbonate resin having a diameter of 120 mm and a thickness of 0.60 mm with a convexoconcave pattern of a guide groove having a depth of 160 nm, a groove width (bottom width) of 0.25 μm and a track pitch 0.74 μm was prepared.

The surface of the first substrate was spin-coated with a coating solution in which the cyanine compound (A), a squarylium metal chelate compound No. 8 as shown in Table 1 and further a formazan metal chelate compound represented by the following Structural Formula (IV) were mixed at a mass ratio (A/No. 8/IV) of 4/3/3 and the mixture was dissolved in 2,2,3,3-tetrafluoropropanol to thereby form a first recording layer having a thickness of about 45 nm. The formazan metal chelate compound was added as a light resistance stabilizer.

Figure 8:
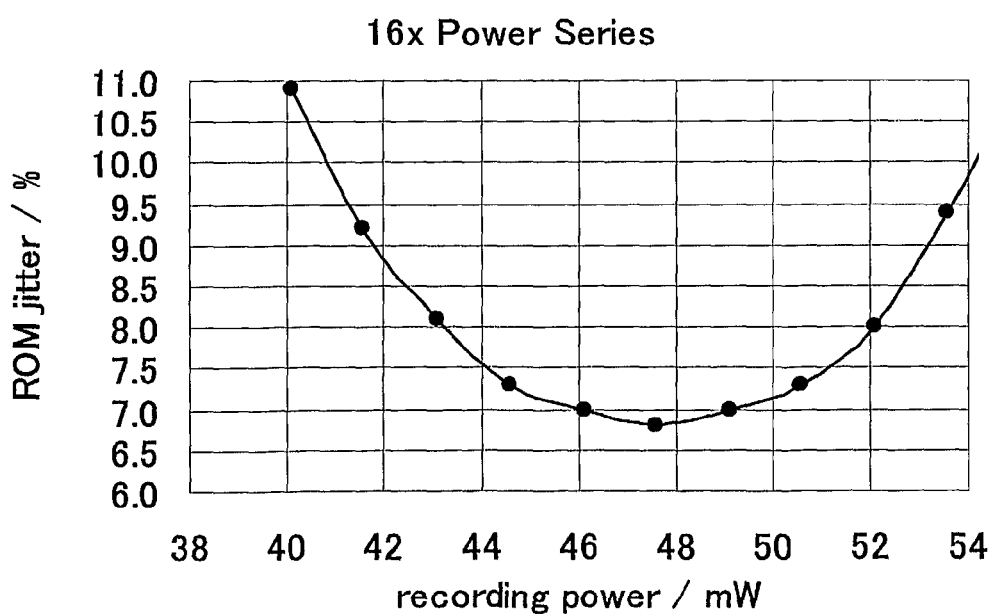
FIG. 8 is a graph showing the evaluation results of signals (dependency on recording power of jitter at the time of recording at 16× speed) in Example 9.

Next, on the first recording layer, a reflective layer composed of AgIn (99.5/0.5) having a thickness of 100 nm was formed by sputtering using Ar as a sputtering gas, thereby forming a first information layer. Next, the first information layer and a polycarbonate dummy substrate having the same shape as the first substrate were laminated to each other using an ultraviolet curable adhesive (KAYARAD DVD802, manufactured by Nippon Kayaku Co., Ltd.) to thereby prepare a single-sided single-layer optical recording medium. On the obtained optical recording medium, DVD signals (8-16) were recorded under conditions of a wavelength of 659 nm, a lens NA of 0.65 and a linear velocity of 55.84 m/s (16× speed), and thereafter, the reproducing properties thereof were evaluated under DVD ROM reproduction conditions of a wavelength of 650 nm, a lens NA of 0.60 and a linear velocity of 3.49 m/s. Then, the recording power dependency of jitter property was evaluated. As a result, it was verified that the optical recording medium had signal properties satisfying the DVD+R standard. FIG. 8 shows the results.

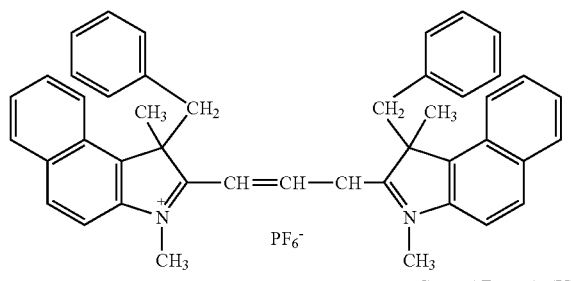

General Formula (IV)

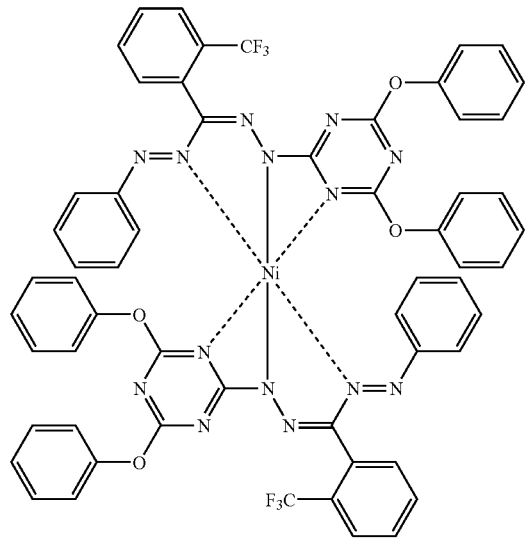

General Formula (V)

TABLE 2

| | Recording layer | Cyanine | Squarylium | Formazan | Mixing ratio | I14H (%) | I14/I14H (%) | Jitter (%) | PIsum8 at initial stage | PIsum8 after storing at 80° C. and 85% RH |
|---|---|---|---|---|---|---|---|---|---|---|
| Ex. 1 | 2nd recording layer | A | No. 8 | Not used | 60/40 | 22 | 63 | 7.1 | 15 | 20 |
| Ex. 2 | 1st recording layer | A | No. 8 | Not used | 40/60 | 18 | 65 | 6.5 | 20 | 20 |
| Ex. 2 | 2nd recording layer | A | No. 8 | Not used | 60/40 | 17 | 62 | 7.8 | 20 | 20 |

TABLE 2-continued

| | Recording layer | Cyanine | Squarylium | Formazan | Mixing ratio | I14H (%) | I14/I14H (%) | Jitter (%) | PIsum8 at initial stage | PIsum8 after storing at 80° C. and 85% RH |
|---|---|---|---|---|---|---|---|---|---|---|
| Ex. 3 | 2nd recording layer | A | No. 11 | Not used | 15/85 | 16 | 63 | 8.2 | 15 | 15 |
| Ex. 4 | 1st recording layer | A | No. 1 | Not used | 50/50 | 17 | 65 | 7.2 | 15 | 15 |
| Ex. 5 | 2nd recording layer | A | No. 4 | Not used | 70/30 | 16 | 65 | 8.3 | 15 | 20 |
| Ex. 6 | 2nd recording layer | A | No. 7 | Not used | 65/35 | 19 | 62 | 7.5 | 20 | 20 |
| Ex. 7 | 2nd recording layer | A | No. 10 | Not used | 10/90 | 16 | 63 | 8.1 | 15 | 100 |
| Ex. 8 | 2nd recording layer | A | No. 2 | Not used | 60/40 | 16 | 63 | 8.0 | 15 | 60 |
| Compara. Ex. 1 | 2nd recording layer | Not used | No. 1 | Not used | 0/100 | 18 | 69 | 9.3 | 20 | 30 |
| Compara. Ex. 2 | 2nd recording layer | V | No. 2 | Not used | 60/40 | 17 | 67 | 8.4 | 15 | 300 |
| | DVD + R Standard Value | | | | | 16 or more | 60 or more | 9 or less | 280 or less | 280 or less |

The invention claimed is:

1. An optical recording material, comprising:
a cyanine compound represented by general formula (A),

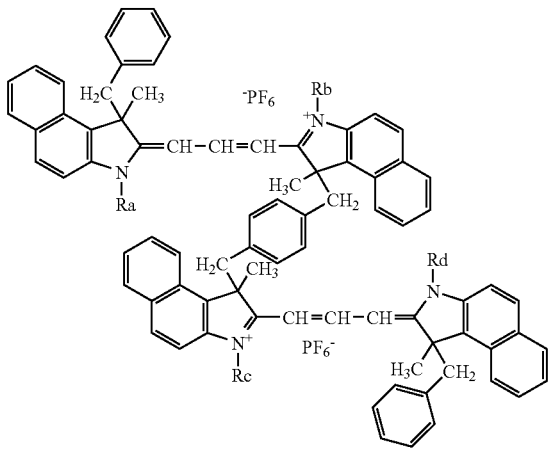

where Ra, Rb, Rc and Rd represent independently a hydrogen atom, an alkyl group that may have a substituent group, an aryl group that may have a substituent group or an aralkyl group that may have a substituent group, and a squarylium compound represented by general formula (I),

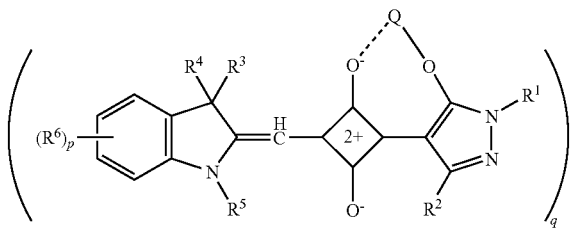

where $R^1$ and $R^2$ may be the same to each other or different from each other and respectively represent an alkyl group that may have a substituent group, an aralkyl group that may have a substituent group, an aryl group that may have a substituent group or a heterocyclic group that may have a substituent group; "Q" represents a metal atom having a coordinating ability; "q" is an integer of 2 or 3; $R^3$ and $R^4$ may be the same to each other or different front each other, and respectively represent an alkyl group that may have a substituent group, an aralkyl group that may have a substituent group, or an aryl group that may have a substituent group, and $R^3$ and $R^4$ may be bound to each other to form an alicyclic hydrocarbon ring or a heterocyclic ring; $R^5$ represents a hydrogen atom, an alkyl group that may have a substituent group, an aralkyl group that may have a substituent group or an aryl group that may have a substituent group; $R^6$ represents halogen atom, an alkyl group that may have a substituent group, an aralkyl group that may have a substituent group, an aryl group that may have a substituent group, a nitro group, a cyano group or an alkoxy group that may have a substituent group; "p" is an integer of 0 to 4; here, when "p" is an integer of 2 to 4, each $R^6$ may be the same to each other or different from each other, and further two adjacent $R^6$s may be bound to two adjacent carbon atoms to form an aromatic ring that may have a substituent group.

2. The optical recording material according to claim 1, wherein a mixing ratio, A/I, of the cyanine compound (A) and the squarylium compound (I) is 10/90 to 70/30 by weight ratio.

3. The optical recording material according to claim 1, wherein "Q" is aluminum.

4. The optical recording material according to claim 1, wherein $R^1$ is a phenyl group, and $R^2$ is an unsubstituted or a halogen-substituted alkyl group.

5. The optical recording material according to claim 4, wherein $R^2$ is a trifluoromethyl group.

6. The optical recording material according to claim 4, wherein $R^2$ is an alkyl group having a branched chain.

7. The optical recording material according to claim 6, wherein $R^2$ is an isopropyl group.

8. The optical recording material according to claim 1, wherein $R^3$ and $R^4$ may be the same to each other or different from each other and respectively represent a benzyl group that may have a substituent group.

9. The optical recording material according to claim 1, wherein $R^5$ is a benzyl group.

10. The optical recording material according to claim 1, wherein two adjacent $R^6$ groups bound to two adjacent carbon atoms form a fused benzene ring.

11. An optical recording medium, comprising:
a substrate, and
an optical recording material formed on the substrate,
wherein the optical recording material comprises a cyanine compound represented by general formula (A), (A)

where Ra, Rb, Rc and Rd represent independently a hydrogen atom, an alkyl group that may have a substituent group, an aryl group that may have a substituent group or an aralkyl group that may have a substituent group, and a squarylium compound represented by general formula (I), (I)

where $R^1$ and $R^2$ may be the same to each other or different from each other and respectively represent an alkyl group that may have a substituent group, an aralkyl group that may have a substituent group, an aryl group that may have a substituent group or a heterocyclic group that may have a substituent group; "Q" represents a metal atom having a coordinating ability; "q" is an integer of 2 or 3; $R^3$ and $R^4$ may be the same to each other or different from each other, and respectively represent an alkyl group that may have a substituent group, an aralkyl group that may have a substituent group, or an aryl group that may have a substituent group, and $R^3$ and $R^4$ may be bound to each other to form an alicyclic hydrocarbon ring or a heterocyclic ring; $R^5$ represents a hydrogen atom, an alkyl group that may have a substituent group, an aralkyl group that may have a substituent group or an aryl group that may have a substituent group; $R^6$ represents a halogen atom, an alkyl group that may have a substituent group, an aralkyl group that may have a substituent group, an aryl group that may have a substituent group, a nitro group, a cyano group or an alkoxy group that may have a substituent group; "p" is an integer of 0 to 4; here, when "p" is an integer of 2 to 4, each $R^6$ may be the same to each other or different from each other, and further two adjacent $R^6$s may be bound to two adjacent carbon atoms to form an aromatic ring that may have a substituent group.

12. The optical recording medium according to claim 11, wherein the recording layer further comprises a formazan chelate compound.

13. A method for recording and reproducing an optical recording medium, comprising:
performing any one of recording or reproducing of signal information by irradiating an optical recording medium with a laser beam having a recording wavelength of 580 nm to 720 nm from a substrate surface side thereof,
wherein the optical recording medium comprises a substrate, and an optical recording material formed on the substrate,
wherein the optical recording material comprises
a cyanine compound represented by general formula (A), (A)

where Ra, Rb, Rc and Rd represent independently a hydrogen atom, an alkyl group that may have a substituent group, an aryl group that may have a substituent group or an aralkyl group that may have a substituent group, and a squarylium compound represented by general formula (I), (I)

where $R^1$ and $R^2$ may be the same to each other or different from each other and respectively represent an alkyl group that may have a substituent group, an aralkyl group that may have a substituent group, an aryl group that may have a substituent group or a heterocyclic group that may have a substituent group; "Q" represents a metal atom having a coordinating ability; "q" is an integer of 2 or 3; $R^3$ and $R^4$ may be the same to each other or different from each other, and respectively represent an alkyl group that may have a substituent group, an aralkyl group that may have a substituent group, or an aryl group that may have a substituent group, and $R^3$ and $R^4$ may be bound to each other to form an alicyclic hydrocarbon ring or a heterocyclic ring; $R^5$ represents a hydrogen atom, an alkyl group that may have a substituent group, an aralkyl group that may have a substituent group or an aryl group that may have a substituent group; $R^6$ represents a halogen atom, an alkyl group that may have a substituent group, an aralkyl group that may have a substituent group, an aryl group that may have a substituent group, a nitro group, a cyano group or an alkoxy group that may have a substituent group; "p" is an integer of 0 to 4; here, when "p" is an integer of 2 to 4, each $R^6$ may be the same to each other or different from each other, and further two adjacent $R^6$s may be bound to two adjacent carbon atoms to form an aromatic ring that may have a substituent group.

\* \* \* \* \*